United States Patent
Ko

(10) Patent No.: US 10,643,134 B2
(45) Date of Patent: May 5, 2020

(54) SCHEDULE MANAGEMENT METHOD, SCHEDULE MANAGEMENT SERVER, AND MOBILE TERMINAL USING THE METHOD

(71) Applicant: Samsung Electronics Co. Ltd., Suwon-si, Gyeonggi-do (KR)

(72) Inventor: Jae-woo Ko, Uiwang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 380 days.

(21) Appl. No.: 13/960,156

(22) Filed: Aug. 6, 2013

(65) Prior Publication Data
US 2014/0052675 A1    Feb. 20, 2014

(30) Foreign Application Priority Data
Aug. 16, 2012 (KR) .................. 10-2012-0089517

(51) Int. Cl.
*G06N 5/02* (2006.01)
*G06N 20/00* (2019.01)
*G06Q 10/10* (2012.01)

(52) U.S. Cl.
CPC ............... *G06N 5/02* (2013.01); *G06N 20/00* (2019.01); *G06Q 10/1093* (2013.01)

(58) Field of Classification Search
CPC ................................................. G06Q 10/1093
See application file for complete search history.

(56) References Cited

U.S. PATENT DOCUMENTS

| | | | | |
|---|---|---|---|---|
| 7,864,073 | B2* | 1/2011 | Lee | G01C 21/343 340/506 |
| 8,112,299 | B2 | 2/2012 | Kim et al. | |
| 8,118,223 | B2 | 2/2012 | Hammad et al. | |
| 8,543,694 | B2* | 9/2013 | Petersen | H04L 41/069 709/224 |
| 2001/0056443 | A1* | 12/2001 | Takayama | G06F 17/21 707/513 |
| 2004/0135902 | A1 | 7/2004 | Steensma | |

(Continued)

FOREIGN PATENT DOCUMENTS

| | | |
|---|---|---|
| CN | 101640721 A | 2/2010 |
| CN | 102413231 A | 4/2012 |

(Continued)

OTHER PUBLICATIONS

Chinese Office Action dated Aug. 16, 2018, issued in the Chinese Patent Application No. 201380043459.3.
(Continued)

*Primary Examiner* — Vincent Gonzales
*Assistant Examiner* — Seth Andrew Raker
(74) *Attorney, Agent, or Firm* — Jefferson IP Law, LLP

(57) ABSTRACT

A schedule management method is provided. The schedule management method includes acquiring user schedule information, extracting at least one piece of expected event information based on the user schedule information, collecting event information generated through near field communication, comparing the collected event information and the expected event information, and providing guidance information corresponding to the collected event information based on a result of the comparison.

56 Claims, 19 Drawing Sheets

(56) References Cited

U.S. PATENT DOCUMENTS

| | | | |
|---|---|---|---|
| 2006/0122861 A1* | 6/2006 | Scott | G06Q 10/00 705/7.19 |
| 2007/0060108 A1* | 3/2007 | East | H04Q 7/38 455/414.1 |
| 2007/0256034 A1* | 11/2007 | Hiraoka | G06F 17/30398 715/864 |
| 2008/0165032 A1* | 7/2008 | Lee | G01C 21/343 340/988 |
| 2008/0170075 A1* | 7/2008 | Muramatsu | G06F 17/30265 345/467 |
| 2008/0201212 A1 | 8/2008 | Hammad et al. | |
| 2009/0162028 A1* | 6/2009 | Tanaka | H04N 5/77 386/248 |
| 2009/0265390 A1* | 10/2009 | Asanuma | G06Q 10/06 |
| 2009/0298426 A1 | 12/2009 | Helvick | |
| 2010/0030434 A1* | 2/2010 | Okabe | A61B 5/165 701/48 |
| 2010/0030612 A1 | 2/2010 | Kim et al. | |
| 2010/0211585 A1* | 8/2010 | Ito | G06Q 10/109 707/758 |
| 2010/0274855 A1* | 10/2010 | Wassingbo | G06Q 10/109 709/206 |
| 2010/0293613 A1* | 11/2010 | Hum | G06Q 20/32 726/20 |
| 2010/0333020 A1* | 12/2010 | Jeong | G06Q 10/109 715/810 |
| 2011/0066976 A1* | 3/2011 | Hwang | G06F 3/04883 715/810 |
| 2011/0134468 A1 | 6/2011 | Gha | |
| 2011/0177830 A1* | 7/2011 | Clipsham | G08B 1/08 455/456.3 |
| 2011/0193878 A1* | 8/2011 | Seo | H04M 1/72544 345/619 |
| 2011/0200980 A1* | 8/2011 | Takahashi | G06F 9/4446 434/365 |
| 2012/0131185 A1* | 5/2012 | Petersen | H04L 41/069 709/224 |
| 2013/0080534 A1* | 3/2013 | Ogawa | G06F 17/30979 709/204 |
| 2013/0174054 A1* | 7/2013 | Lee | H04N 21/422 715/753 |
| 2013/0275531 A1* | 10/2013 | Hahm | H04W 4/12 709/206 |
| 2014/0052675 A1* | 2/2014 | Ko | G06N 5/02 706/12 |

FOREIGN PATENT DOCUMENTS

| | | | | |
|---|---|---|---|---|
| EP | 2 150 034 A1 | | 2/2010 | |
| EP | 2 395 462 A1 | | 12/2011 | |
| EP | 2395462 A1 | * | 12/2011 | G06Q 10/109 |
| JP | 2008123214 A | * | 5/2008 | |
| KR | 10-2006-0007280 A | | 1/2006 | |
| KR | 10-2009-0048097 A | | 5/2009 | |
| KR | 10-0936254 B1 | | 1/2010 | |
| KR | 10-2011-0034274 A | | 4/2011 | |
| WO | 03/107129 A2 | | 12/2003 | |
| WO | 2009-015482 A1 | | 2/2009 | |
| WO | WO 2009015482 A1 | * | 2/2009 | G06Q 10/109 |
| WO | 2011-106108 A1 | | 9/2011 | |
| WO | WO 2011106108 A1 | * | 9/2011 | G06Q 10/109 |

OTHER PUBLICATIONS

Indian Office Action dated Oct. 30, 2018, issued in the Indian Patent Application No. 497/MUMNP/2015.
Korean Office Action dated Jan. 10, 2019, issued in Korean Application No. 10-2012-0089517.
Chinese Notification of Reexamination dated Feb. 27, 2019, issued in Chinese Application No. 201380043459.3.
Korean Office Action dated Jul. 12, 2019, issued in Korean Application No. 10-2012-0089517.
Chinese Notification of Reexamination dated Jun. 24, 2019, issued in Chinese Application No. 201380043459.3.
Chinese Decision of Reexamination dated Oct. 31, 2019, issued in Chinese Application No. 201380043459.3.

* cited by examiner

FIG. 3A
FIG. 3B
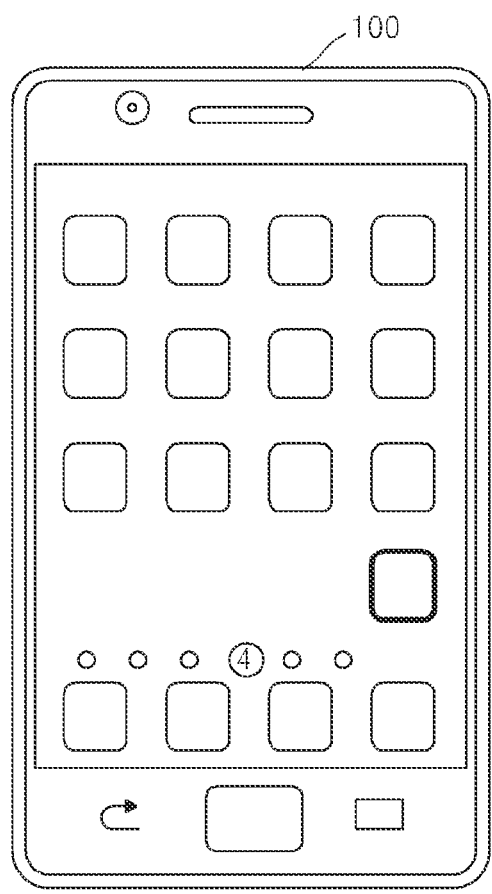
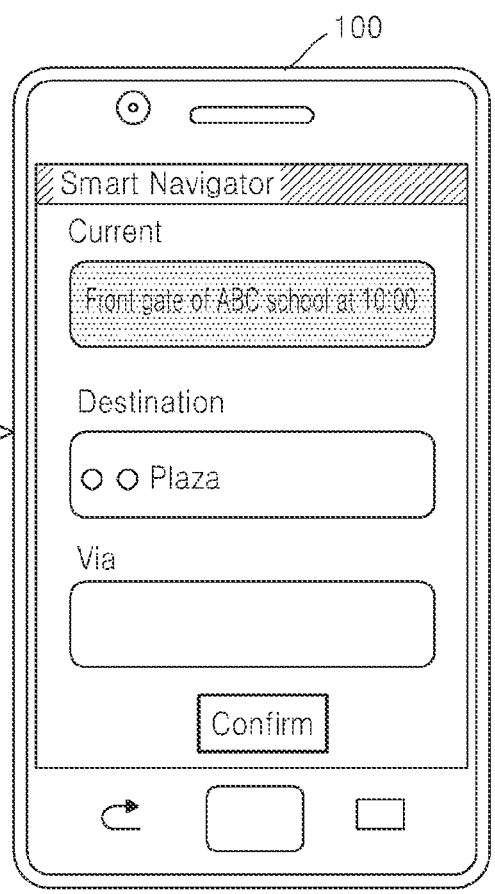

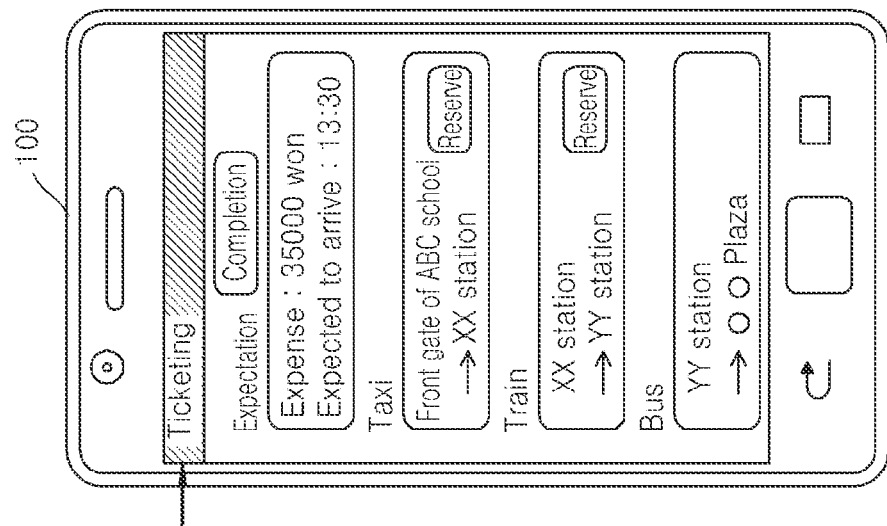
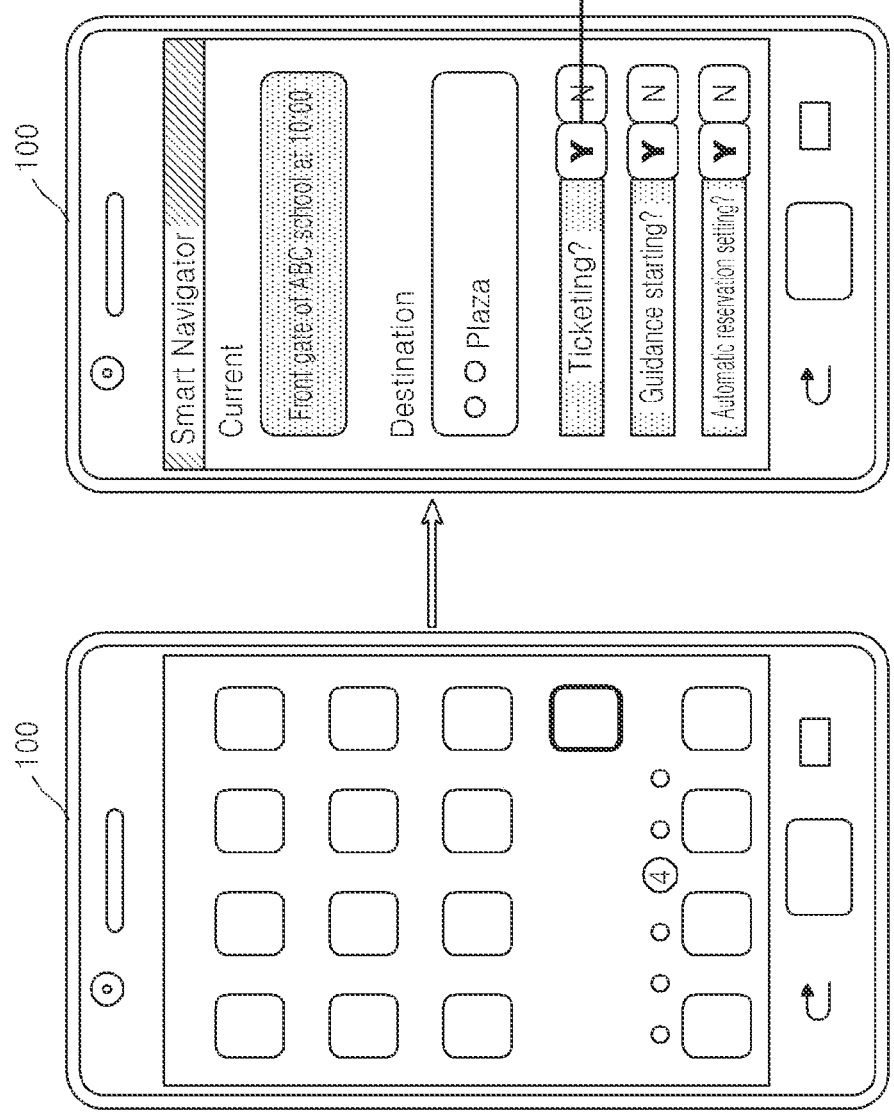
FIG. 4A  FIG. 4B  FIG. 4C

FIG. 6

| SEQUENCE | TRAVEL ROUTE | TRANSPORTATION | EXPECTED EVENT ATTRIBUTE | EXPECTED OCCURRENCE TIME | POSITION |
|---|---|---|---|---|---|
| 1 | FRONT GATE OF ABC SCHOOL (ORIGIN) – XX STATION | COMMON TAXI: OOga1234 | TAXI FARE PAYMENT | 10:30 | XX STATION |
| 2 | XX STATION – YY STATION | KTX: No. 101 | TRAIN STATION ENTRANCE PASSAGE | 10:50 | XX STATION |
| 3 | YY STATION – OO PLAZA (DESTINATION) | CITY BUS: No. 123 | BUS FARE PAYMENT | 13:00 | YY STATION |
| ... | ... | ... | ... | ... | ... |

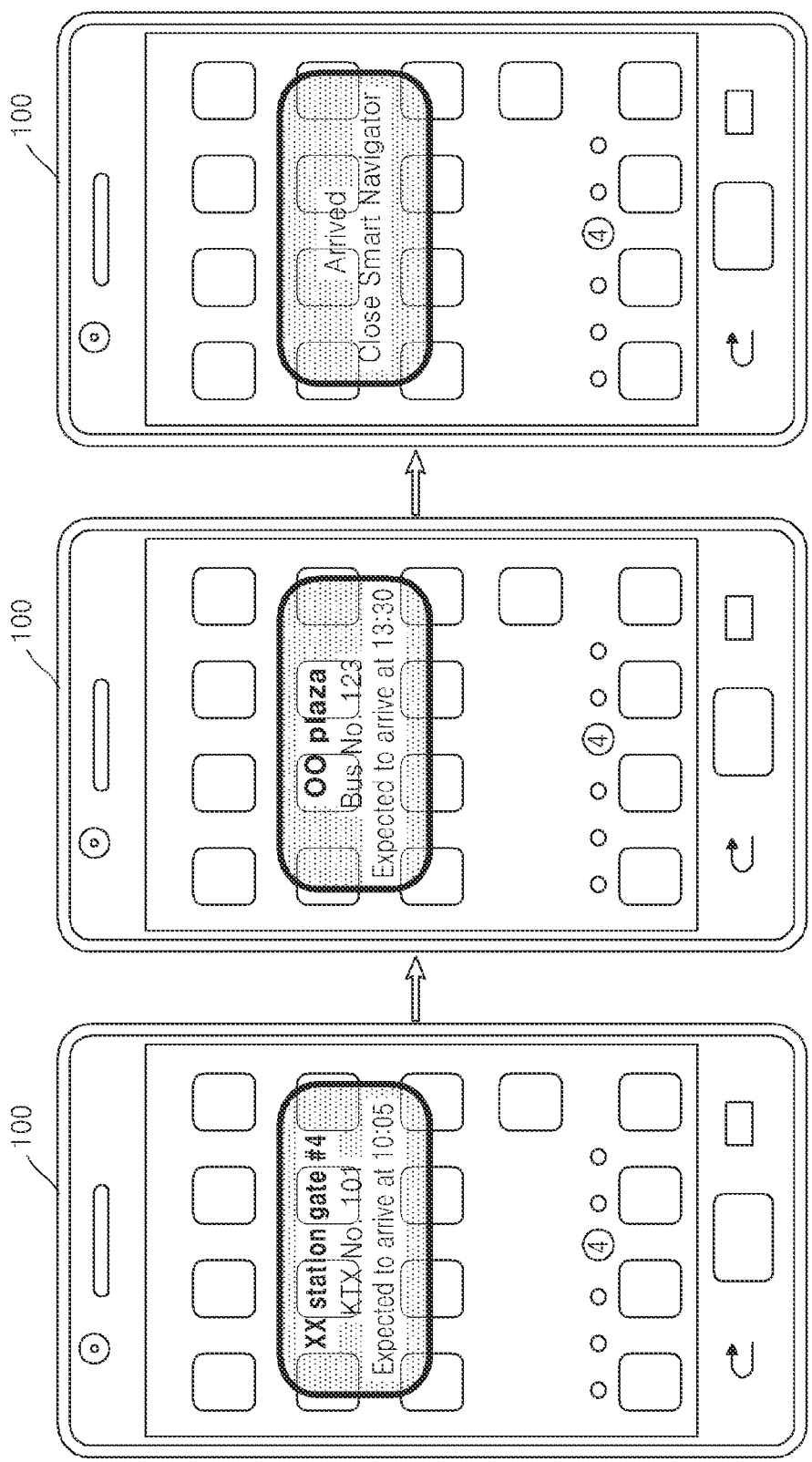

FIG. 11

| July | SUN | MON | TUE | WED | THU | FIR | SAT |
|---|---|---|---|---|---|---|---|
| | 1 | 2 | 3 | 4 | | 6 | 7 |
| | 8 | 9 | 10 | 11 | 5 Engagement with OO BB neighbourhood XX coffee shop 3:00 PM | 13 | 14 |
| | | | | | 12 | | |
| | 15 | 16 Medical treatment 3:00 PM | 17 | 18 | 19 | 20 Business trip to China | 21 |
| | 22 | 23 | 24 | 25 | 26 | 27 | 28 Birthday party for AAA |
| | 29 | 30 | 31 | | | | |

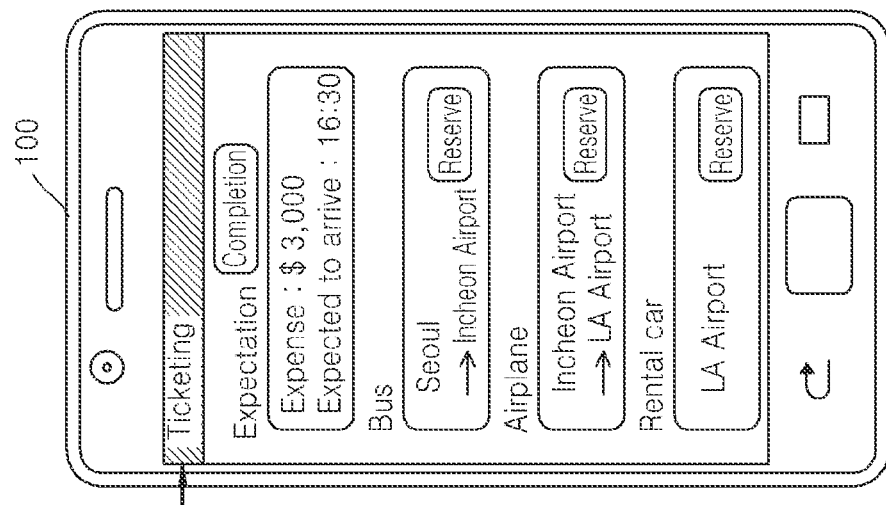
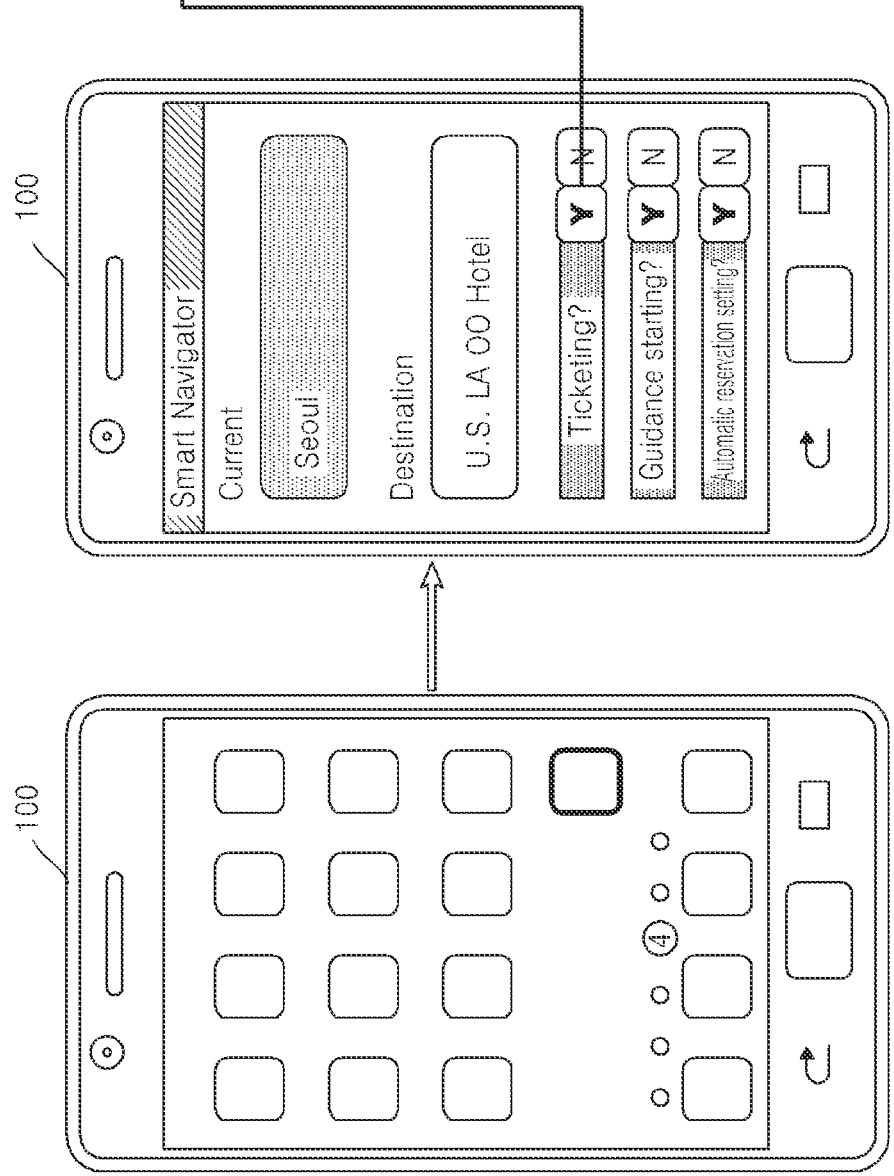

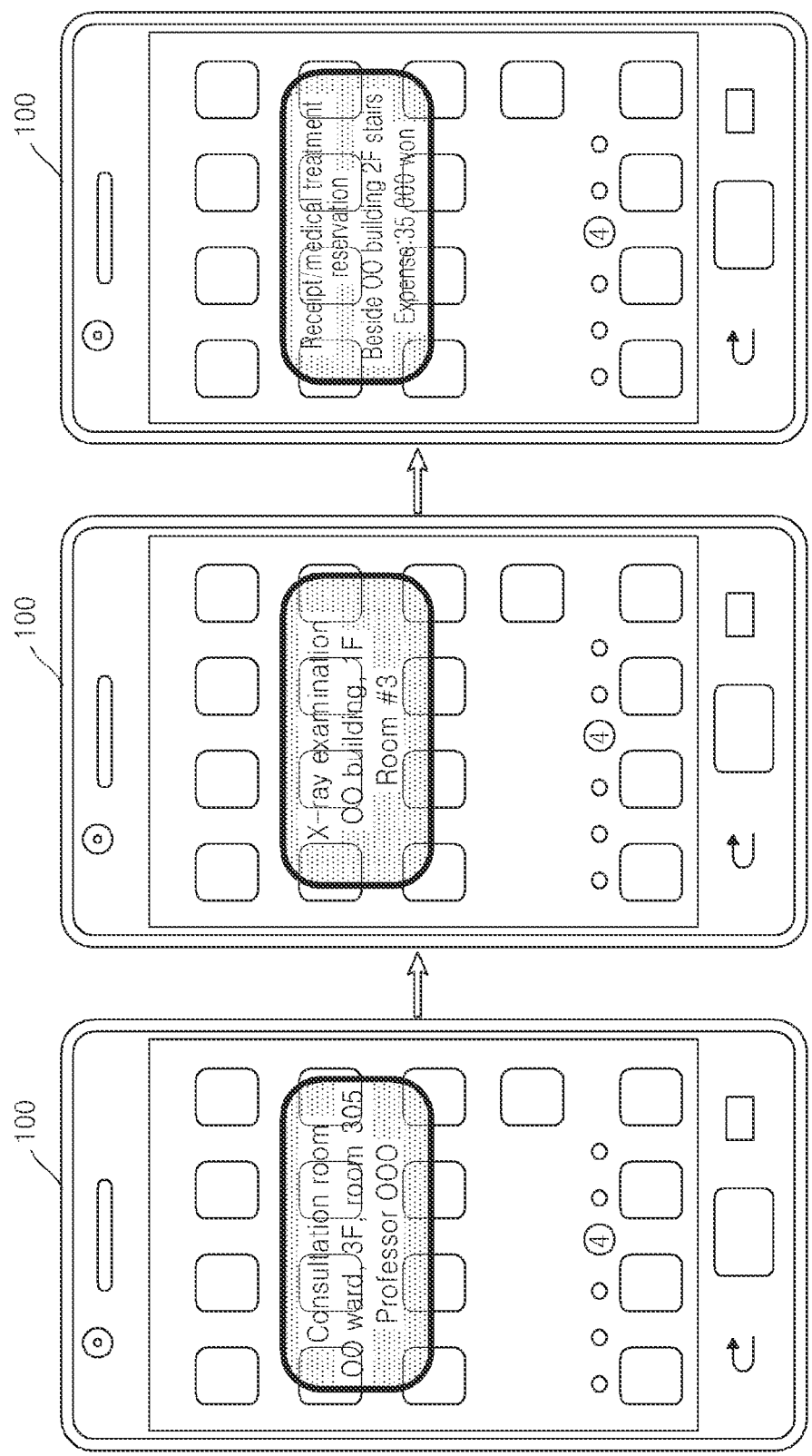

SCHEDULE MANAGEMENT METHOD, SCHEDULE MANAGEMENT SERVER, AND MOBILE TERMINAL USING THE METHOD

CROSS-REFERENCE TO RELATED PATENT APPLICATION(S)

This application claims the benefit under 35 U.S.C.§ 119(a) of Korean patent application filed on Aug. 16, 2012 in the Korean Intellectual Property Office and assigned Serial No. 10-2012-0089517, the entire disclosure of which is hereby incorporated by reference.

TECHNICAL FIELD

The present disclosure relates to scheduling. More particularly, the present disclosure relates to schedule management methods, schedule management servers, and mobile terminals for managing a user's schedule.

BACKGROUND

Mobile terminals may be configured to perform various functions, examples of which include data and voice communication, taking still pictures or moving pictures through a camera, voice recording, playing music files through a speaker system, and displaying images or videos. Furthermore, as the development of smartphones is accelerated, various applications are being developed. Examples of the various applications may include a schedule management mobile application for preventing a user from missing an appointment by failing to check a notebook or a calendar. However, a general schedule management mobile application simply displays schedule information, which is registered by a user, to the user. That is, the general schedule management mobile application fails to provide schedule-related guidance information, which a user actually needs, by reflecting the current situation or location of the user.

Therefore, there is a need for a schedule management system that provides guidance information in consideration of the current situation or location of a user, which enables the user to fulfill a schedule.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a schedule management method, a schedule management server, and a mobile terminal using the method, which compares expected event information extracted based on user schedule information and event information collected through near field communication, manages a user schedule, and provides guidance information according to the user schedule.

In accordance with an aspect of the present disclosure, a schedule management method of a mobile terminal is provided. The schedule management method includes acquiring user schedule information, extracting at least one piece of expected event information based on the user schedule information, collecting event information generated through near field communication, comparing the collected event information and the expected event information, and providing guidance information corresponding to the collected event information based on a result of the comparison.

The expected event information may include at least one from among expected event attribute, expected occurrence time, and expected occurrence location.

The schedule management method may further include outputting the extracted expected event information.

The schedule management method may further include updating the expected event information based on a difference between the collected event information and the expected event information.

The updating of the expected event information may include searching for a new travel route and transportation to get to a destination, based on a location at which the event information generated through the near field communication is collected, and updating the expected event information according to the new travel route and transportation.

The schedule management method may further include updating the expected event information at predetermined periods.

The schedule management method may further include updating the expected event information based on a location of the mobile terminal.

The schedule management method may further include outputting the updated expected event information.

The updating of the expected event information may include generating a plurality of pieces of expected route information based on the collected event information, displaying the plurality of pieces of generated expected route information, receiving a selection of at least one of the plurality of pieces of expected route information, and updating the expected event information based on the selected expected route information.

The acquiring of the user schedule information may include transmitting reservation request information including at least one from among traffic information, lodging information, and restaurant information to a reservation server based on a user input, and receiving reservation result information from the reservation server.

The extracting of the expected event information may include determining a travel route and transportation based on the user schedule information, and extracting the expected event information based on the travel route and transportation.

The determining of the travel route and transportation may include determining the travel route and transportation in further consideration of a user preference.

The schedule management method may further include displaying guidance information corresponding to an event, which is to occur first, based on the extracted expected event information.

The user schedule information may include at least one from among origin information, route information, destination information, traffic reservation information, lodging reservation information, and restaurant reservation information.

The providing of the guidance information may include setting a disclosure range of the guidance information based on a user input, and providing the guidance information within the set disclosure range.

The providing of the guidance information may include providing the guidance information corresponding to the collected event information in a pop-up form.

In accordance with another aspect of the present disclosure, a schedule management method of a schedule management server is provided. The schedule management method includes acquiring user schedule information, extracting at least one piece of expected event information based on the user schedule information, receiving event information collected through near field communication by a mobile terminal from the mobile terminal, comparing the received event information and the expected event information, and providing guidance information corresponding to the received event information to the mobile terminal based on a result of the comparison.

The schedule management method may further include providing the extracted expected event information to the mobile terminal.

The schedule management method may further include updating the expected event information based on a difference between the received event information and the expected event information.

The updating of the expected event information may include searching for a new travel route and transportation to get to a destination, based on a location at which the received event information is collected, and updating the expected event information according to the new travel route and transportation.

The schedule management method may further include providing the updated expected event information to the mobile terminal.

The updating of the expected event information may include generating a plurality of pieces of expected route information based on the collected event information, providing the plurality of pieces of generated expected route information to the mobile terminal, receiving a user selection of at least one of the plurality of pieces of expected route information from the mobile terminal, and updating the expected event information based on the selected expected route information.

The acquiring of the user schedule information may include receiving reservation request information including at least one from among traffic information, lodging information, and restaurant information from the mobile terminal.

The extracting of the expected event information may include determining a travel route and transportation based on the user schedule information, and extracting the expected event information based on the travel route and transportation.

The determining of the travel route and transportation may include determining the travel route and transportation in further consideration of a user preference.

The extracting of the expected event information may include providing guidance information corresponding to an event, which is to occur first, to the mobile terminal based on the extracted expected event information.

The providing of the guidance information to the mobile terminal may include receiving disclosure range setting information of the guidance information from the mobile terminal, and providing the guidance information to the mobile terminal based on the disclosure range setting information.

In accordance with another aspect of the present disclosure, a mobile terminal is provided. The mobile terminal includes a schedule information management unit that acquires user schedule information, an extraction unit that extracts at least one piece of expected event information based on the user schedule information, a wireless communication unit that collects event information generated through near field communication, a comparison unit that compares the collected event information and the expected event information, an output unit that provides guidance information corresponding to the collected event information based on a result of the comparison, and a control unit that controls the schedule information management unit, the extraction unit, the wireless communication unit, the comparison unit, and the output unit.

The output unit may output the extracted expected event information.

The control unit may update the expected event information based on a difference between the collected event information and the expected event information.

The control unit may search for a new travel route and transportation to get to a destination, based on a location at which the event information generated through the near field communication is collected, and update the expected event information according to the new travel route and transportation.

The control unit may update the expected event information at predetermined periods.

The control unit may update the expected event information based on a location of the mobile terminal.

The output unit may output the updated expected event information.

The control unit may generate a plurality of pieces of expected route information based on the collected event information, display the plurality of pieces of generated expected route information, receive a selection of at least one of the plurality of pieces of expected route information, and update the expected event information based on the selected expected route information.

The schedule information management unit may transmit reservation request information including at least one from among traffic information, lodging information, and restaurant information to a reservation server based on a user input, and receive reservation result information from the reservation server.

The extraction unit may determine a travel route and transportation based on the user schedule information, and extract the expected event information based on the determined travel route and transportation.

The extraction unit may determine the travel route and transportation in further consideration of a user preference.

The output unit may display guidance information corresponding to an event, which is to occur first, based on the extracted expected event information.

The control unit may set a disclosure range of the guidance information based on a user input, and the output unit may provide the guidance information within the set disclosure range.

The output unit may provide the guidance information corresponding to the collected event information in a pop-up form.

In accordance with another aspect of the present disclosure, a schedule management server is provided. The schedule management server includes a schedule information management unit that acquires user schedule information, an extraction unit that extracts at least one piece of expected event information based on the user schedule information, a reception unit that receives event information collected through near field communication by a mobile terminal from the mobile terminal, a comparison unit that compares the received event information and the expected event information, a transmission unit that provides guidance information corresponding to the received event information to the mobile terminal based on a result of the comparison, and a control unit that controls the schedule information management unit, the extraction unit, the reception unit, the comparison unit, and the transmission unit.

The transmission unit may provide the extracted expected event information to the mobile terminal.

The control unit may update the expected event information based on a difference between the received event information and the expected event information.

The control unit may search for a new travel route and transportation to get to a destination, based on a location at which the received event information is collected, and update the expected event information according to the new travel route and transportation.

The transmission unit may provide the updated expected event information to the mobile terminal.

The control unit may generate a plurality of pieces of expected route information based on the collected event information, the transmission unit may provide the plurality of pieces of generated expected route information to the mobile terminal, and the reception unit may receive a user selection of at least one of the plurality of pieces of expected route information from the mobile terminal.

The reception unit may receive reservation request information including at least one from among traffic information, lodging information, and restaurant information from the mobile terminal.

The extraction unit may determine a travel route and transportation based on the user schedule information, and extract the expected event information based on the determined travel route and transportation.

The extraction unit may determine the travel route and transportation in further consideration of a user preference.

The transmission unit may provide guidance information corresponding to an event, which is to occur first, to the mobile terminal based on the extracted expected event information.

The reception unit may receive disclosure range setting information of the guidance information from the mobile terminal, and the transmission unit may provide the guidance information to the mobile terminal based on the disclosure range setting information Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A and 3B are diagrams illustrating a screen for acquiring user schedule information according to an embodiment of the present disclosure;

FIGS. 4A, 4B, and 4C are diagrams illustrating a screen for acquiring reservation information according to an embodiment of the present disclosure;

FIG. 6 is a diagram illustrating expected event information according to an embodiment of the present disclosure;

FIGS. 9A, 9B, and 9C are diagrams illustrating a screen for providing guidance information corresponding to event information according to an embodiment of the present disclosure;

FIGS. 11 and 12A, 12B, and 12C are diagrams illustrating a schedule management method according to an embodiment of the present disclosure;

FIGS. 16A, 16B, 16C are diagrams illustrating a business trip schedule management system according to an embodiment of the present disclosure;

FIGS. 17A, 17B, and 17C are diagrams illustrating a medical treatment schedule management method according to an embodiment of the present disclosure;

The same reference numerals are used to represent the same elements throughout the drawings.

DETAILED DESCRIPTION

Figure 1:
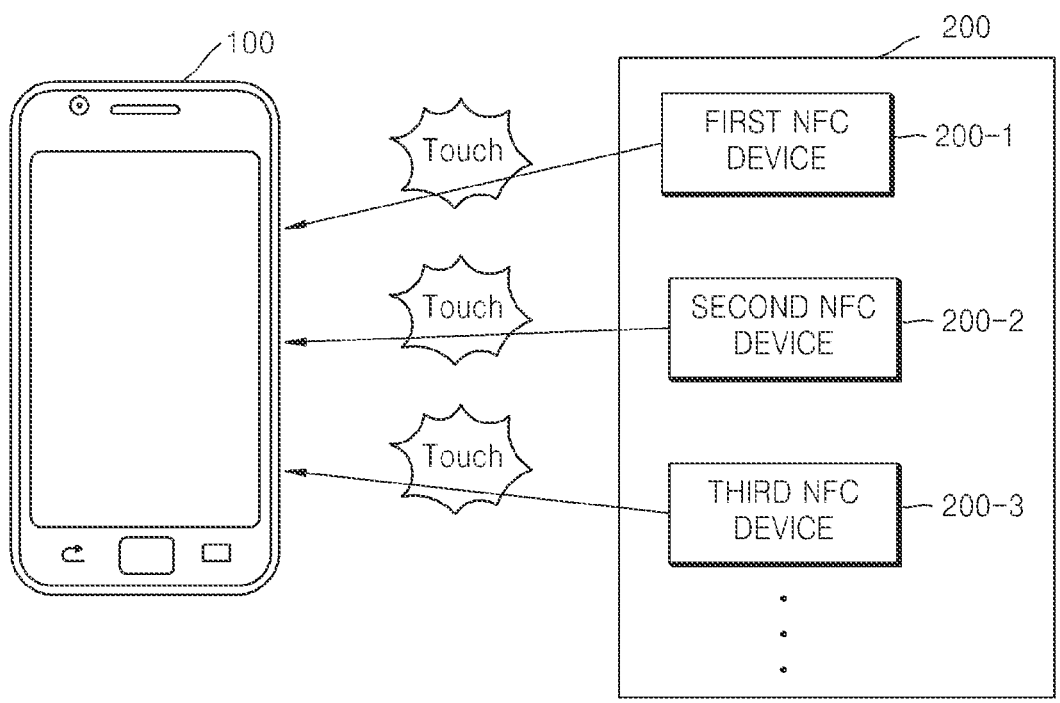
FIG. 1 is a diagram illustrating a schedule management system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purples of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that the terms "comprises", "includes", and "has", when used herein, specify the presence of stated elements, but do not preclude the presence of other elements, unless otherwise defined. Also, the terms "unit" and "module" used herein represent a unit for processing at least one function or operation, which may be implemented by hardware, software, or a combination of hardware and software.

As used herein, expressions such as "at least one of," when preceding a list of elements, modify the entire list of elements and do not modify the individual elements of the list.

Various embodiments of the present disclosure will be described below in detail with reference to the accompanying drawings so that those skilled in the art may easily implement the present disclosure. The present disclosure may, however, be embodied in many different forms and should not be construed as being limited to the various embodiments set forth herein. In addition, portions irrelevant to the description of the present disclosure will be omitted in the drawings for a clear description of the present disclosure, and like reference numerals will denote like elements throughout the specification.

FIG. 1 is a diagram illustrating a schedule management system according to an embodiment of the present disclosure.

The schedule management system according to an embodiment of the present disclosure may include a mobile terminal 100 and a Near Field Communication (NFC) device 200. The NFC device 200 may include a plurality of NFC drives, for example, first NFC device 200-1, second NFC device 200-2, and third NFC device 200-3.

The mobile terminal 100 according to an embodiment of the present disclosure may include an NFC chip for NFC. The NFC chip is a type of electronic tag (e.g., Radio Frequency IDentification (RFID)), and may be a contactless NFC module using a frequency band of about 13.56 MHz. NFC may be used to transmit data between terminals within a short distance of about 10 cm. NFC may include a Peer-To-Peer (P2P) mode, a Reader/Writer (R/W) mode, and a card emulation mode.

The NFC chip according to an embodiment of the present disclosure may be installed inside the mobile terminal 100, or may be installed outside the mobile terminal in the form of a dongle or an accessory.

The mobile terminal 100 according to an embodiment of the present disclosure may store a mobile card in a security region. The mobile card may be a card implemented in the form of software in the mobile terminal 100.

Examples of the security region may include a Universal Subscriber Identity Module (USIM). The USIM is a combination of a Subscriber Identity Module (SIM) and a Universal IC Card (UICC), and implements various functions, such as user authentication, global roaming, and e-commerce, in one card. The USIM includes a micro Central Processing Unit (CPU) and a memory. The micro CPU identifies a user through an encryption/decryption function, and the memory is used as a storage space for supplementary services.

The mobile terminal 100 according to an embodiment of the present disclosure may collect event information through NFC. An event according to an embodiment of the present disclosure may include a touch event where the user touches the mobile terminal 100 against the NFC device 200. When the user touches the mobile terminal 100 against the NFC device 200, the mobile terminal 100 may detect a touch event of the user and communicate data with the NFC device 200 through NFC.

The mobile terminal 100 according to an embodiment of the present disclosure may be implemented in various forms. Examples of the mobile terminal 100 described herein may include portable terminals, smartphones, laptop computers, tablets, e-book terminals, digital broadcasting terminals, Personal Digital Assistants (PDAs), and Portable Multimedia Players (PMPs).

The NFC device 200 may an NFC tag for transmitting data to the mobile device 100. The NFC device 200 according to an embodiment of the present disclosure may store location information, identification information, and link information (e.g., Uniform Resource Locator (URL)).

The NFC device 200 according to an embodiment of the present disclosure may include a payment terminal. The payment terminal is a terminal providing a payment. Examples of the payment terminal may include a Credit Authorization Terminal (CAT) and a Point-Of-Sales (POS) terminal. Also, the payment terminal according to an embodiment of the present disclosure may be in the form of a portable terminal.

Figure 2:
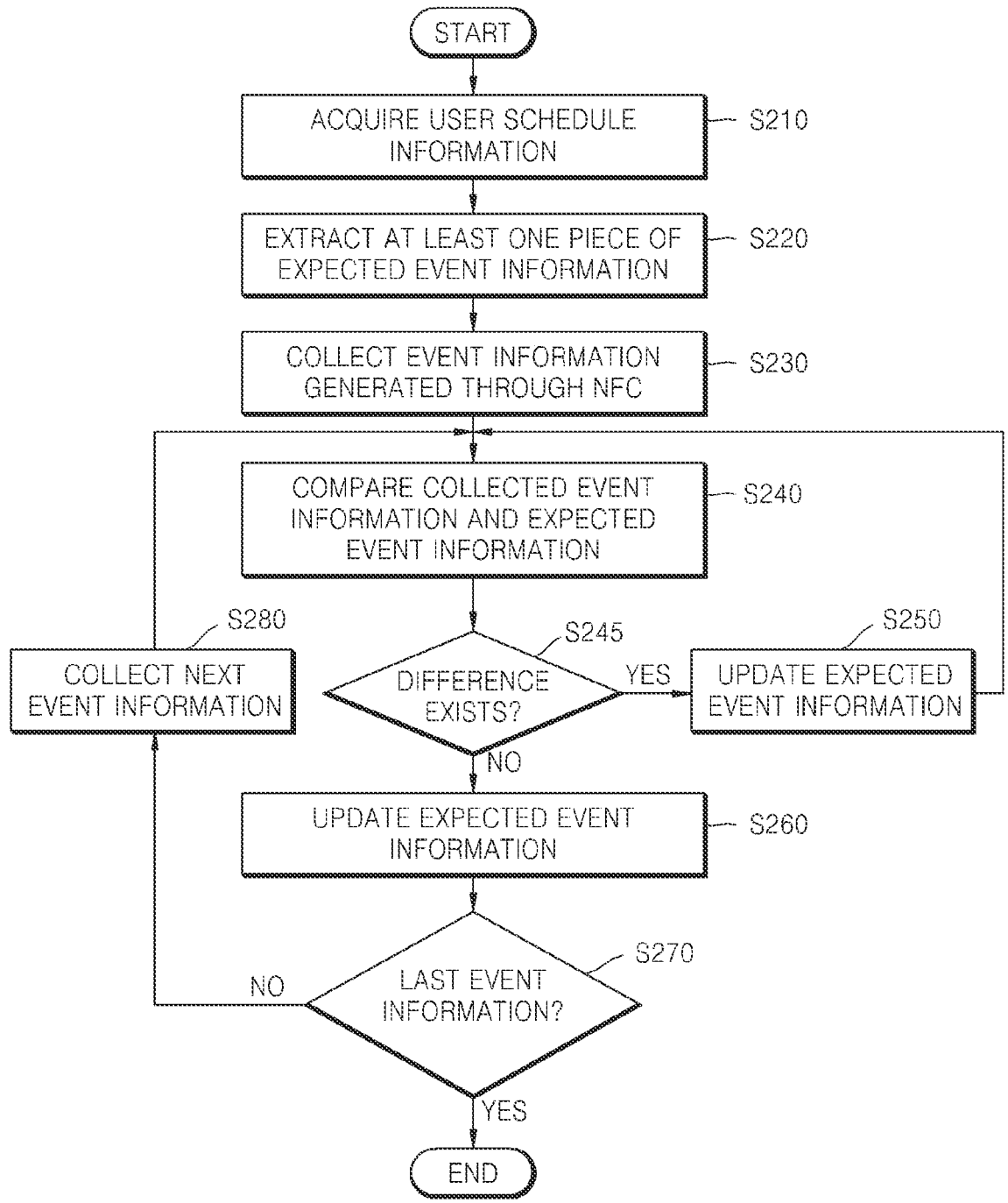
FIG. 2 is a flowchart illustrating a schedule management method of a mobile terminal according to an embodiment of the present disclosure.

FIG. 2 is a flowchart illustrating a schedule management method of a mobile terminal according to an embodiment of the present disclosure.

Referring to FIG. 2, in operation S210, the mobile terminal 100 may acquire user schedule information. As information about a current or future schedule registered or stored by the user, the user schedule information according to an embodiment of the present disclosure may include schedule type, origin information, route information, destination information, and reservation information (e.g., traffic reservation information, lodging reservation information, restaurant reservation information, and medical treatment reservation information), and engagement information with an acquaintance, but the present disclosure is not limited thereto.

A schedule according to an embodiment of the present disclosure may include a trip schedule, a business trip schedule, an acquaintance visit schedule, a medical treatment schedule, and an exploration schedule, but the present disclosure is not limited thereto.

According to an embodiment of the present disclosure, the mobile terminal 100 may receive an input of user schedule information directly from the user. According to another embodiment of the present disclosure, the mobile terminal 100 may receive the user schedule information from an external server that stores the user schedule information. In this case, the mobile terminal 100 may receive the user schedule information from the external server at predetermined periods by communicating with the external server.

In operation S220, the mobile terminal 100 may extract at least one piece of expected event information based on the user schedule information.

The expected event information according to an embodiment of the present disclosure may include at least one of expected event attribute, expected occurrence time, and expected occurrence location. The expected event attribute is a type of an expected event, and may include a payment event, a gate passage event, and a touch event on an NFC device installed at a predetermined location.

The mobile terminal 100 according to an embodiment of the present disclosure may determine a travel route and transportation based on the user schedule information. Then, the mobile terminal 100 may extract the expected event information based on the determined travel route and transportation.

For example, when the user reserves a medical treatment at 3:00 PM on Mar. 5, 2012 and registers the same as a user schedule in the mobile terminal 100, and the current time is 2:00 PM on Mar. 5, 2012, the mobile terminal 100 may search for the best travel route (e.g., shortest distance or lowest expense) from a house, which is the current location of the user, to XX hospital, which is the destination, and transportation based on the medical treatment reservation schedule of the user.

Then, the mobile terminal 100 may extract the expected event information based on the found travel route and transportation. When the travel route determined based on the user schedule information is "get on a bus first, get on the subway second, and get on a taxi third", the mobile terminal 100 may extract a touch event on an NFC device installed at a bus stop, a bus fare payment event, a subway gate passage event (e.g., subway transfer event), and a taxi fare payment event as the expected event information.

Then, the mobile terminal 100 may construct the expected event information about an expected occurrence time and an expected occurrence location of each of the touch event on the NFC device installed at the bus stop, the bus fare payment event, the subway gate passage event (e.g., subway transfer event), and the taxi fare payment event, in a database.

Also, according to an embodiment of the present disclosure, the mobile terminal 100 may determine a travel route and transportation in consideration of a user preference (e.g., preferred transportation and preferred travel route). For example, when the user has serious motion sickness on the bus and prefers to use a subway rather than to use a bus, the mobile terminal 100 may determine a travel route and transportation to the destination by minimizing a bus route and maximizing a subway route.

According to an embodiment of the present disclosure, the mobile terminal 100 may output the expected event information. In this case, the user may check all the expected event information, and generate an NFC touch event on the travel route according to the expected event information.

In operation S230, the mobile terminal 100 may collect event information generated through NFC. The event information may include an attribute of an event generated through NFC, an event occurrence time (e.g., event collection time), an event occurrence location (e.g., event collection location), and information received from the NFC device 200.

For example, when there occurs a payment event where a payment is made through the mobile card stored in the mobile terminal 100, the mobile terminal 100 may collect a payment event occurrence time, a payment event occurrence location, and payment content (e.g., a payment amount, a payment terminal code, and franchise store identification information) as the event information. The payment content may be collected from a payment terminal (e.g., POS terminal) or a payment server (e.g., a credit card company server).

Also, when a gate passage event occurs, the mobile terminal 100 may collect a gate passage event occurrence time, a gate passage event occurrence location, a gate name, and identification information of an NFC tag attached to a gate, as the event information.

In operation S240, the mobile terminal 100 may compare the collected event information and the expected event information. That is, the mobile terminal 100 may compare an actual event and an expected event.

For example, the mobile terminal 100 may compare the attribute, occurrence time and occurrence location (Global Positioning System (GPS) coordinates or NFC device identification code) of an event generated through NFC, with the attribute, occurrence time and occurrence location of an expected event. In operation S245, the mobile terminal 100 determines, based on the comparison performed in operation S240, whether a difference exists between the collected event information and the expected event information.

If it is determined that a difference exists between the collected event information and the expected event information in operation S245, the mobile terminal 100 may update the expected event information in operation S250.

According to an embodiment of the present disclosure, the mobile terminal 100 may update the expected event information based on a difference between an event attribute included in the collected event information and an expected event attribute included in the expected event information.

For example, when the expected event information is arranged in the order of event A→event B→event C, and when a currently-expected event is event B but actually-collected event information is event D, the mobile terminal 100 may update the expected event information to event D→event E based on the actually-collected event D information. That is, when the expected event information is a tax fare payment event but the actually-collected event information is a bus fare payment event, the mobile terminal 100 may update the expected event information based on the actually-collected bus fare payment event.

According to an embodiment of the present disclosure, the mobile terminal 100 may update the expected event information based on a difference between the actual event information collection time through NFC and the expected occurrence time of an expected event. For example, when the difference between the actual event information collection time and the expected occurrence time is more than a predetermined time (e.g., about 5 minutes or more), the mobile terminal 100 may update the expected occurrence time included in the expected event information (e.g., about 5 minutes later).

According to an embodiment of the present disclosure, the mobile terminal 100 may update the expected event information based on a difference between the actual event information collection location and the expected occurrence location included in the expected event information.

For example, when the expected occurrence location of event A is a region 'a' but the actual collection location of event A is a region 'b', the mobile terminal 100 may update the expected event information based on information about the region 'b' corresponding to the actual collection location of event A.

According to an embodiment of the present disclosure, the mobile terminal 100 may search for a new travel route and transportation to get to the destination, based on the actual collection location of the event information. Then, the mobile terminal 100 may update the expected event information based on the new travel route and transportation.

On the other hand, according to an embodiment of the present disclosure, the mobile terminal 100 may update the expected event information at predetermined periods. For example, the mobile terminal 100 may update the expected event information in units of 10 seconds based on the location (GPS information) of the mobile terminal 100.

Also, the mobile terminal 100 may update the expected event information based on the location of the mobile terminal 100. That is, the mobile terminal 100 may update the expected event information upon every arrival at a predetermined location.

According to an embodiment of the present disclosure, the mobile terminal 100 may output the updated expected event information. After operation S250, the mobile terminal 100 returns to operation S240.

If it is determined that a difference does not exist between the collected event information and the expected event information in operation S245, the mobile terminal 100 may provide guidance information corresponding to the collected event information in operation S260. The guidance information may include transportation information, payment information, expense information, reservation information, and information about a next expected event.

For example, when getting on a bus, the user may touch the mobile terminal 100 against a bus fare payment terminal in order to pay a bus fare. In this case, the mobile terminal 100 may collect information about a bus fare payment event. When the bus fare payment event is identical to the expected event, the mobile terminal 100 may provide information about the number of stops until getting off, information about a disembarking stop, and the transportation time until getting off, as guidance information corresponding to the bus fare payment event.

On the other hand, according to an embodiment of the present disclosure, the mobile terminal 100 may set a disclosure range of the guidance information based on a user input. In this case, the mobile terminal 100 may provide the guidance information within the set disclosure range. For example, when a payment event occurs, the mobile terminal 100 may provide only payment/non-payment information, a payment event occurrence location, and a payment event occurrence time as the guidance information corresponding to the payment event, and may not provide payment details information.

According to an embodiment of the present disclosure, the mobile terminal 100 may provide the guidance information corresponding to the collected event information in a pop-up form.

In operation S270, based on the expected event information, the mobile terminal 100 may determine whether the collected event information is the last event information. When the collected event information is not the last event information, the mobile terminal 100 may collect the next event information in operation S280. Then, the mobile terminal 100 may again compare the collected next event information and the expected event information in operation S280. When a difference between the collected next event information and the expected event information is out of a predetermined range, the mobile terminal 100 may update the expected event information; and when the difference is within the predetermined range, the mobile terminal 100 may provide the guidance information corresponding to the collected next event information.

According to an embodiment of the present disclosure, by collecting the event information generated through NFC, the mobile terminal 100 may detect an action of the user more accurately than the case of collecting location information by GPS. When the collected event information is the last event information in operation S270, the mobile terminal 100 may end the schedule management method of the present embodiment.

FIGS. 3A and 3B are diagrams illustrating a screen for acquiring user schedule information according to an embodiment of the present disclosure.

Referring to FIGS. 3A and 3B, according to an embodiment of the present disclosure, the mobile terminal 100 may receive an input of user schedule information about an origin, a destination, and a route directly from the user. That is, the user may execute a schedule management application, as illustrated in FIG. 3A, and may select or input information about an origin (e.g., ABC school front gate at 10:00), a destination (e.g., OO plaza), and a route through the schedule management application, as illustrated in FIG. 3B.

In this case, according to an embodiment of the present disclosure, the mobile terminal 100 may automatically input the current location of the mobile terminal 100 as an origin by using GPS information.

FIGS. 4A, 4B, and 4C are diagrams illustrating a screen for acquiring reservation information according to an embodiment of the present disclosure.

Referring to FIG. 4A, the user may execute a schedule management application. Referring to FIG. 4B, when the user inputs an origin and a destination, the mobile terminal 100 may search for a travel route and transportation based on the origin and the destination. Then, referring to FIG. 4C, the mobile terminal 100 may provide a screen for reserving the found transportation.

When the user checks the transportation reservation screen and inputs a reservation request for each transportation, the mobile terminal 100 may transmit reservation request information to a reservation server based on the user input. Then, the mobile terminal 100 may receive reservation result information about the transportation from the reservation server and store the received reservation result information as user schedule information.

While FIGS. 4A, 4B, and 4C illustrates only transportation reservation, the present disclosure is not limited thereto and may be applied to various cases such as lodge reservation, restaurant reservation, and resort entrance reservation.

FIGS. 5A, 5B, 5C, and 5D are diagrams illustrating an automatic reservation setting screen according to an embodiment of the present disclosure.

According to an embodiment of the present disclosure, the mobile terminal 100 may automatically reserve transportation, lodges, restaurants, and the like based on user schedule information. In this case, the mobile terminal 100 may automatically reserve transportation and the like according to a reservation condition preset by the user.

Figure 5A:
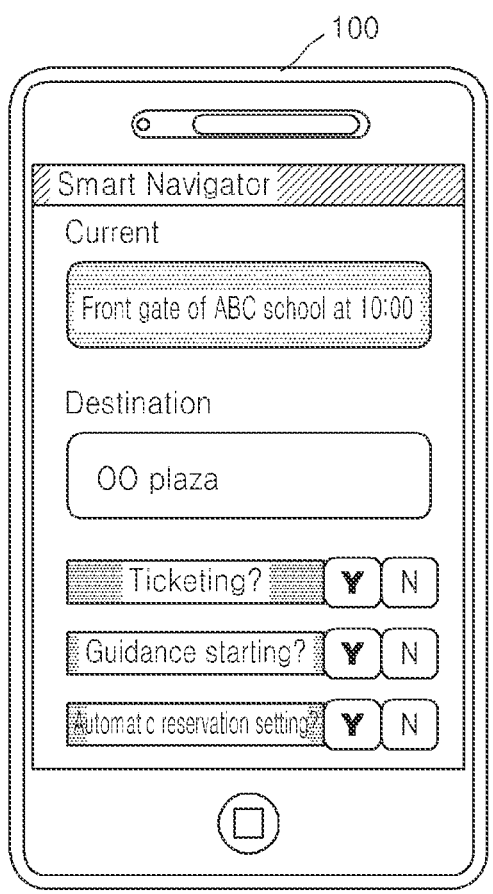
FIGS. 5A, 5B, 5C, and 5D are diagrams illustrating an automatic reservation setting screen according to an embodiment of the present disclosure.
Figure 5B:
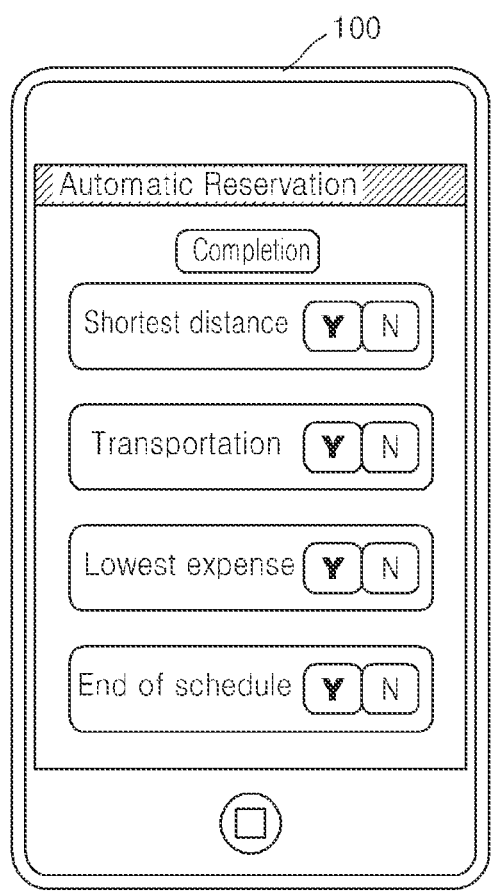

For example, referring to FIGS. 5A and 5B, the user may set an automatic reservation condition through the mobile terminal 100. The automatic reservation condition may include the shortest distance, preferred transportation, the lowest expense, and a schedule type. When the user selects the shortest distance as the automatic reservation condition, the mobile terminal 100 may search for a travel route for the quickest arrival at a destination by the user and automatically reserve transportation according to the found travel route. Also, when the user selects the lowest expense as the automatic reservation condition, the mobile terminal 100 may search for a travel route to get to a destination at the lowest expense and automatically reserve transportation according to the found travel route.

Figure 5C:
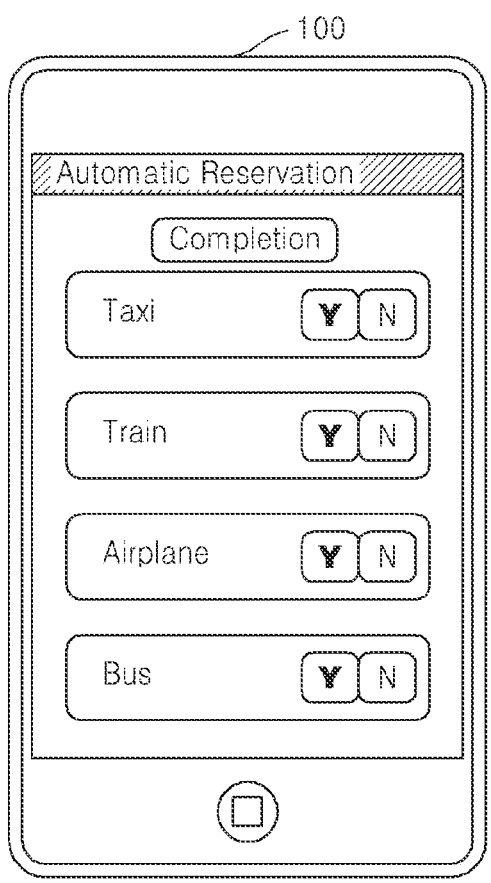

On the other hand, referring to FIG. 5C, the user may set an automatic reservation with respect to only certain transportation. For example, when the user selects a train, an airplane, and a bus (except a taxi) as the automatic reservation condition, the mobile terminal 100 may automatically reserve only a train, an airplane, and a bus among the transportation according to the travel route.

Figure 5D:
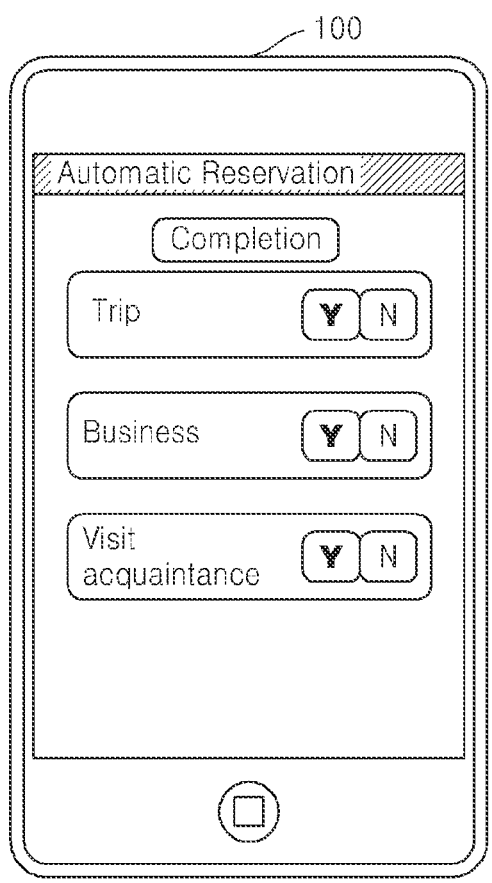

Also, referring to FIG. 5D, the user may set an automatic reservation with respect to only a certain schedule. For example, when the user sets an automatic reservation with respect to only a trip, the mobile terminal 100 may automatically reserve transportation, lodges, and restaurants with respect to only a trip schedule among the user schedules, and may not automatically reserve transportation, lodges, and restaurants with respect to a business (trip) schedule.

FIG. 6 is a diagram illustrating expected event information according to an embodiment of the present disclosure.

It is assumed that the user inputs 'ABC school front gate at 10:00' as an origin and inputs 'OO plaza' as a destination. The mobile terminal 100 may search for a travel route and transportation from 'ABC school front gate' to 'OO plaza'. Then, the mobile terminal 100 may extract expected event information based on the found travel route and transportation.

For example, the search travel route may be 'ABC school front gate (origin)→XX station→YY station→OO plaza (destination)', and the found transportation may be 'common taxi (ABC school→XX station), train (XX station→YY station), and city bus (YY station→OO plaza). In this case, as expected events, the mobile terminal 100 may extract a taxi fare payment through NFC, a train station entrance gate passage through NFC, and a bus fare payment through NFC. Then, the mobile terminal 100 may also extract an expected occurrence time and an expected occurrence location of each expected event as the expected event information.

Figure 7A:
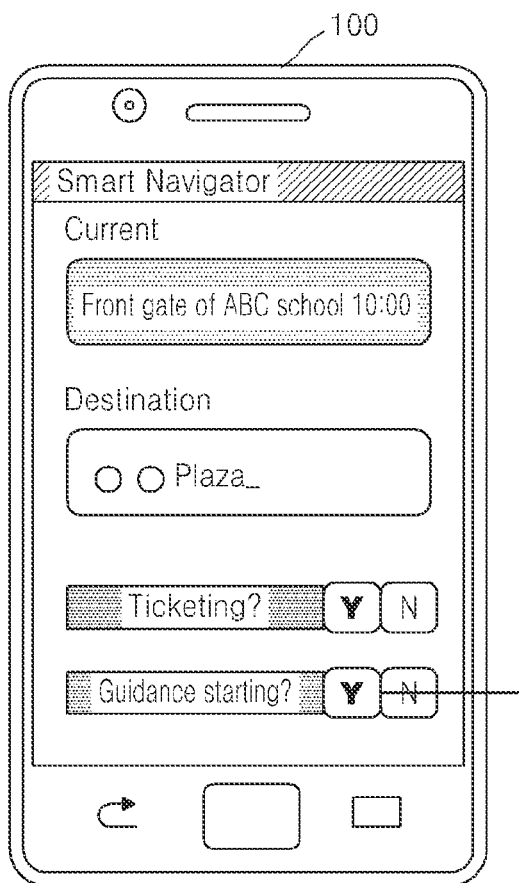
FIGS. 7A and 7B are diagrams illustrating a screen displaying guidance information according to an embodiment of the present disclosure.
Figure 7B:
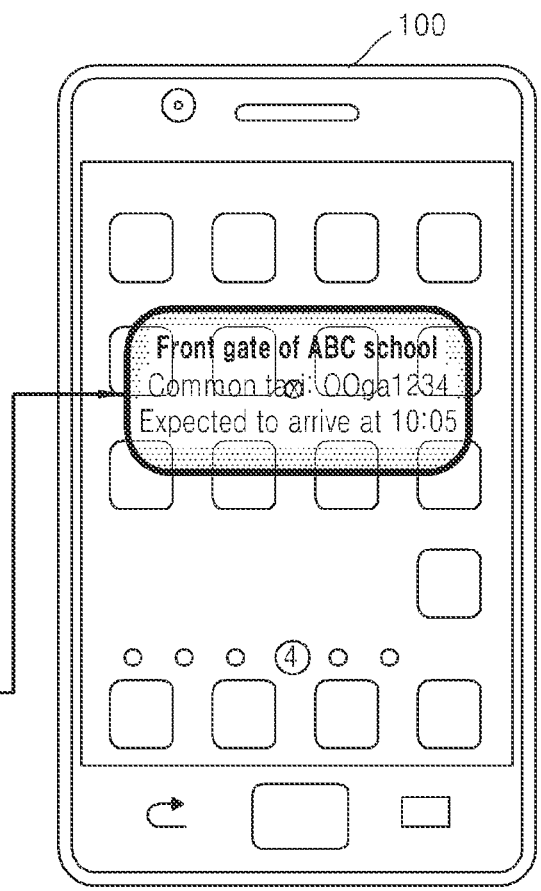

FIGS. 7A and 7B are diagrams illustrating a screen displaying guidance information, according to an embodiment of the present disclosure.

According to an embodiment of the present disclosure, the mobile terminal 100 may display guidance information corresponding to an event, which is to occur first, based on the extracted expected event information.

For example, when a taxi fare payment event occurs first, the mobile terminal 100 may provide taxi-related guidance information prior to the event occurrence. Referring to FIGS. 7A and 7B, the mobile terminal 100 may display identification information (e.g., vehicle number) of a reserved taxi, and expected arrival time information.

Figure 8:
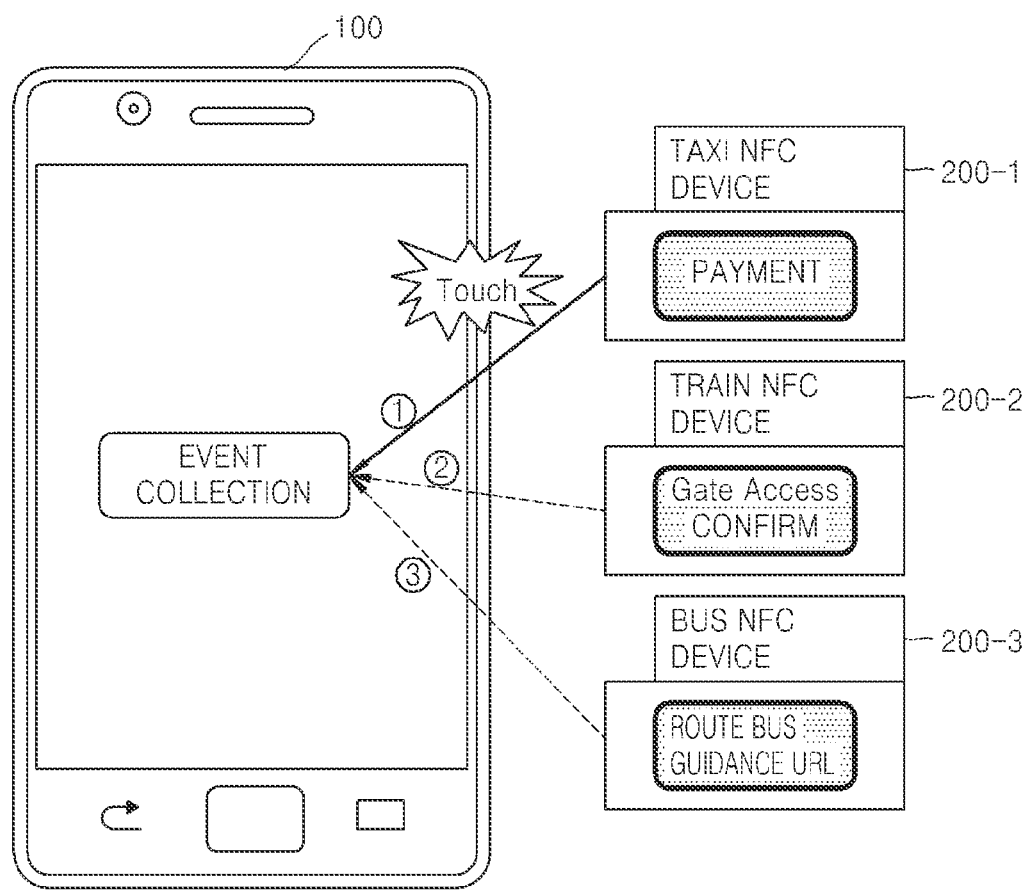
FIG. 8 is a diagram illustrating a method of collecting event information through near field communication according to an embodiment of the present disclosure.

FIG. 8 is a diagram illustrating a method of collecting event information through NFC according to an embodiment of the present disclosure.

Referring to FIG. 8, according to an embodiment of the present disclosure, the mobile terminal 100 may sequentially collect event information that is actually generated through NFC.

For example, first, the mobile terminal 100 may collect payment event information (e.g., a taxi number, a payment amount, a payment event occurrence location, and a payment event occurrence time) generated when the user touches the mobile terminal 100 against a taxi NFC device 200-1.

When the user touches the mobile terminal 100 against the taxi NFC device 200-1, the mobile terminal 100 may transmit mobile card information to the taxi NFC device 200-1 through NFC. In this case, the taxi NFC device 200-1 may request a payment by transmitting mobile card information and payment information (e.g., a payment amount and a payment terminal identification code) to a payment server. When the payment is approved by the payment server, the mobile terminal 100 may receive the payment approval result from the taxi NFC device 200-1 or the payment server (e.g., a credit card company server).

Second, the mobile terminal 100 may collect gate passage event information (e.g., a gate name, a passage time, a gate location, and a gate identification information) generated when the user touches the mobile terminal 100 against a train NFC device 200-2.

Third, the mobile terminal 100 may collect touch event information generated when the user touches the mobile terminal 100 against a bus NFC device 200-3. When the user touches the mobile terminal 100 against the bus NFC device 200-3, the mobile terminal 100 may transmit identification information of a bus, on which the user desires to get on, to the bus NFC device 200-3 through NFC, and receive a route guidance URL of the bus from the bus NFC device 200-3. In this case, the mobile terminal 100 may provide the expected arrival time and the current location of the bus as guidance information to the user based on the bus route guidance URL.

On the other hand, the mobile terminal 100 according to an embodiment of the present disclosure compares each piece of sequentially-collected event information with the expected event information, and provides guidance information corresponding to the collected event information to the user when a difference between the collected event information and the expected event information is within a predetermined range. This will be described in detail with reference to FIGS. 9A, 9B, and 9C.

FIGS. 9A, 9B, and 9C are diagrams illustrating a screen for providing guidance information corresponding to event information according to an embodiment of the present disclosure.

According to an embodiment of the present disclosure, the user may touch the mobile terminal 100 against a train NFC device installed at the entrance of a train station. In this case, the mobile terminal 100 collects train station gate passage event information, and compares the collected event information with the expected event information. For example, when the expected event information includes a touch event where the user touches an aaa NFC device installed at an XX station entrance at 2:00 PM, and the user actually touches the mobile terminal 100 against the aaa NFC device at 2:00 PM, the collected event information is identical to the expected event information.

In this case, referring to FIG. 9A, the mobile terminal 100 may display a train boarding location (e.g., XX station gate #4), train information (e.g., KTX No. 101), and expected arrival time information (e.g., 10:05) as guidance information corresponding to the event information generated by touching a train NFC device.

On the other hand, when the expected event information includes a touch event where the user touches an aaa NFC device installed at an XX station entrance at 2:00 PM, but the user actually touches the mobile terminal 100 against a bbb NFC device installed at a BBB station entrance at 1:50 PM, the collected event information is not identical to the expected event information.

In this case, the mobile terminal 100 updates the expected event information based on the collected event information. For example, when the user is able to move to a destination even from the BBB station, the mobile terminal 100 may search for a new travel route for movement from the BBB station to the destination, and update the expected event information based on the found new travel route.

For example, when there is no train route from the BBB station to the destination, the mobile terminal 100 may add a travel route for movement from the BBB station to the XX station, and update the expected event information (e.g., the expected event occurrence time). Then, the mobile terminal 100 may provide route information for movement to the XX station (e.g., 'no train route from BBB station to YY station', 'move to XX station', and 'available bus: #111 and #123, transportation time: 20 minutes') as guidance information corresponding to a bbb NFC device touch event.

Referring to FIG. 9B, when the user touches the mobile terminal 100 against an NFC device installed at a bus stop near to the YY station, the mobile terminal 100 may collect touch event information, and provide the user with identification information (e.g., bus #123) of a bus to get to OO plaza (destination), the current location of the bus, the expected arrival time of the bus (e.g., expected to arrive at 13:30) as guidance information corresponding to the touch event information.

Also, referring to FIG. 9C, when the user gets off at a stop in front of OO plaza and touches the mobile device 100 to a bus NFC device, the mobile terminal 100 may collect event information, such as a disembarking location, disembarking stop identification information, and a disembarking time. Then, when the collected event information is identical to the expected event information, the mobile terminal 100 may output a destination arrival alarm message as guidance information corresponding to the collected event information.

Figure 10A:
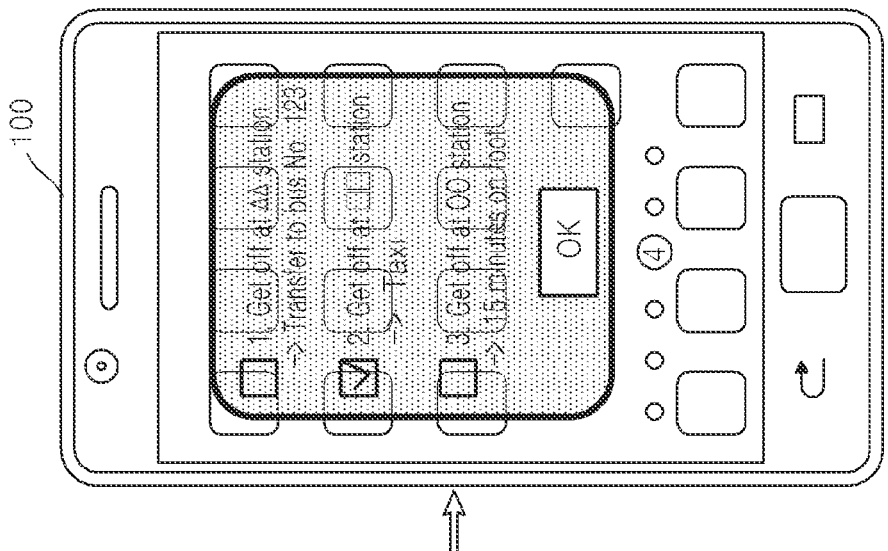
FIGS. 10A, 10B, and 10C are diagrams illustrating a screen for providing a plurality of pieces of expected route information according to an embodiment of the present disclosure.
Figure 10B:
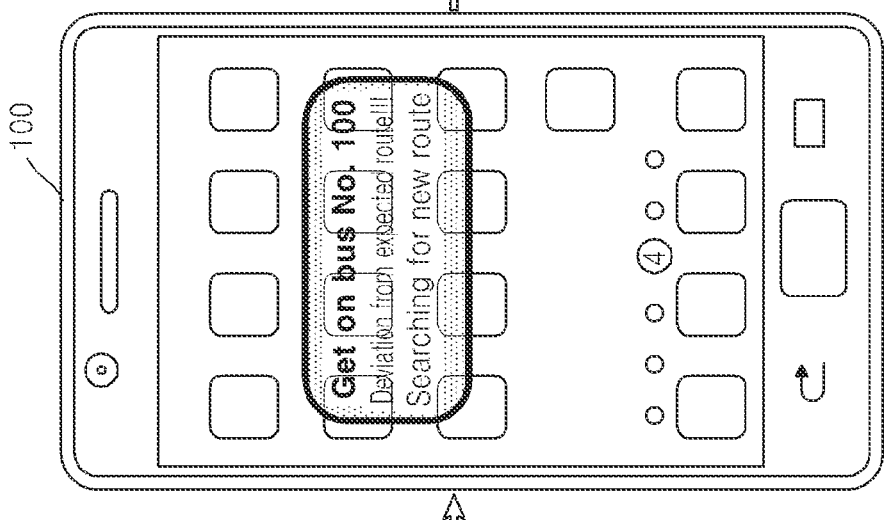
Figure 10C:
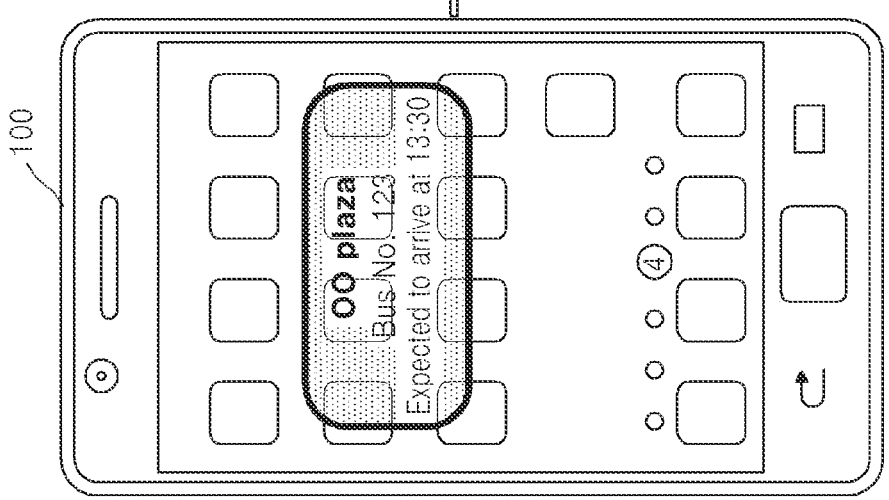

FIGS. 10A, 10B, and 10C are diagrams illustrating a screen for providing a plurality of pieces of expected route information, according to an embodiment of the present disclosure.

Referring to FIG. 10A, when the expected event information includes a touch event where an NFC device of a bus No. 123 is touched, the mobile terminal 100 may provide information about the bus No. 123 (e.g., an expected arrival time and a current location of the bus No. 123) as guidance information.

However, referring to FIG. 10B, when the collected event information is event information corresponding to a touch on a bus NFC device of a bus No. 100, the collected event information (e.g., the event information corresponding to the touch on the bus NFC device of the bus No. 100) is not identical to the expected event information (e.g., the event information corresponding to the touch on the NFC device of the bus No. 123). In this case, the mobile terminal 100 may output guidance information, such as "deviation from an expected route, searching for a new route'.

Then, the mobile terminal 100 updates the expected event information based on the collected event information. According to an embodiment of the present disclosure, the mobile terminal 100 may generate and display a plurality of pieces of expected route information based on the collected event information. For example, referring to FIG. 10C, the mobile terminal 100 may display a plurality of pieces of expected route information, such as 'route for getting off at ΔΔ station and then transferring to bus No. 123', 'route for getting off at □□ station and then taking a taxi', and 'route for getting off at OO station and then moving on foot for 15 minutes'. In this case, the user may select a desired route.

When the user selects 'route for getting off at □□ station and then taking a taxi', the mobile terminal 100 may update the expected event information based on the selected route. The updated expected event information may include 'event of getting off at □□ station at 3:00 and touching the NFC device of bus No. 100' and 'event of paying taxi fare at 3:40 through NFC.'

FIGS. 11 and 12A, 12B, and 12C are diagrams illustrating a schedule management method according to an embodiment of the present disclosure.

Referring to FIG. 11, when the user is scheduled to meet an acquaintance at BB neighborhood on July 5, the mobile terminal 100 may provide guidance information for movement from the current location to the destination, based on the engagement schedule.

The mobile terminal 100 may calculate an expected transportation time for movement from the current location to the destination, and provide an alarm about the engagement schedule to the user in consideration of the expected transportation time. For example, referring to FIG. 12A, when the transportation time to the destination is 50 minutes and the engagement schedule time is 15:00, the mobile terminal 100 may display an alarm message 'should start going to engagement place (BB neighborhood XX coffee shop) after 10 minutes' at 14:00 together with engagement schedule information.

Then, the mobile terminal 100 may search for a travel route and transportation to the destination based on the engagement schedule of the user. For example, the mobile terminal 100 may determine a travel route for getting on a subway at AA station, moving to BB station, and getting on a bus No. 123 to arrive at the destination. In this case, the mobile terminal 100 may extract expected event information (e.g., passing an AA station entrance at 14:20, passing a BB station exit at 14:40, getting on a bus No. 123 at 14:50, and getting off the bus No. 123 at 14:57), which is expected to occur to the destination.

Figure 12:
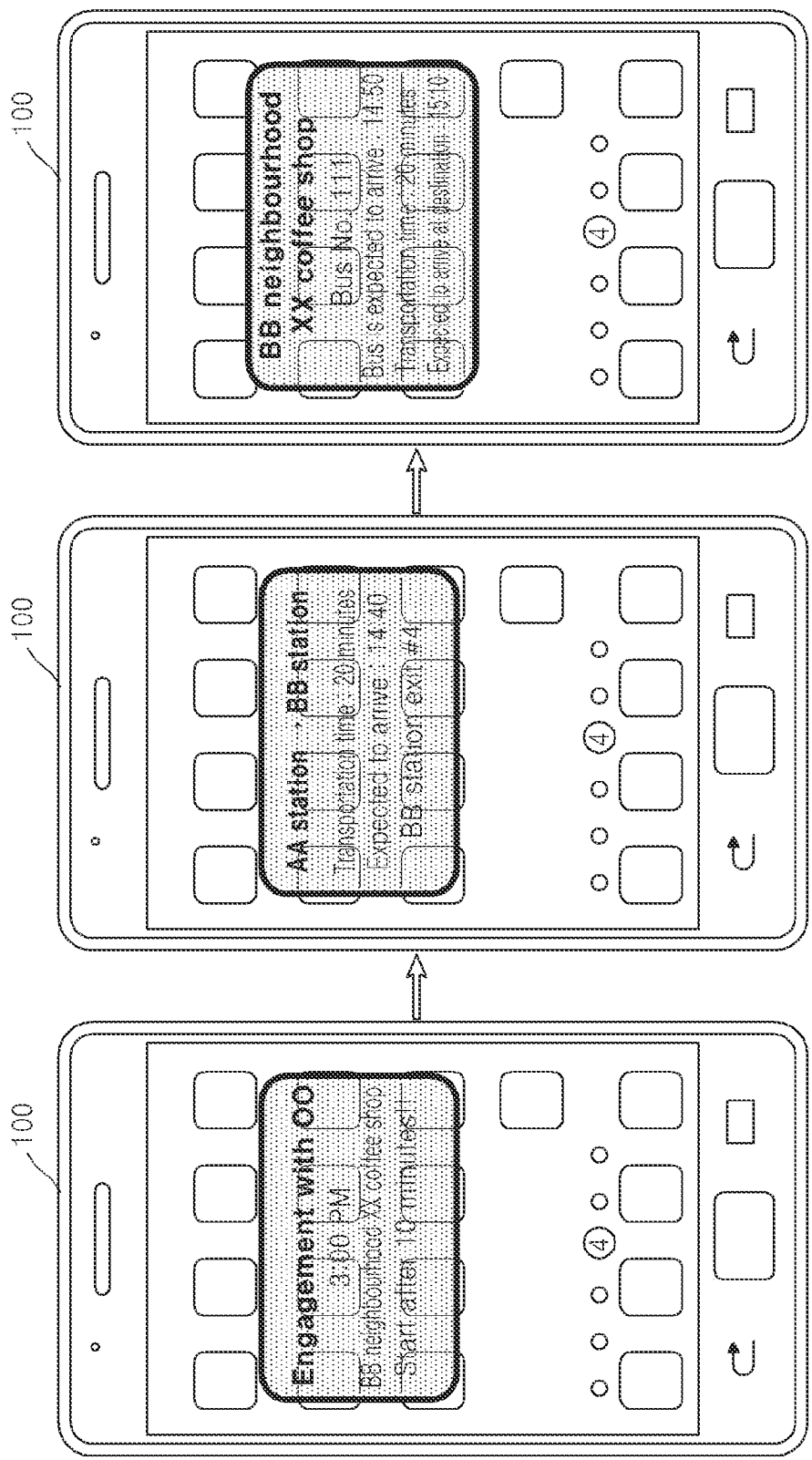

Referring to FIG. 12B, when the user touches the mobile terminal 100 against an NFC device installed at the AA station entrance, the mobile terminal 100 collects an AA station entrance passage event and compares the collected event information and the expected event information. Since the collected event information is identical to the expected event information, the mobile terminal 100 may provide 'AA station→BB station, transportation time: 20 minutes, expected BB station arrival time: 14:40, use BB station exit #4' as guidance information corresponding to the AA station entrance passage event.

On the other hand, when the user passes the BB station by mistake and gets off at a CC station that is farther than the BB station by three stations, the mobile terminal 100 may collect CC station exit passage event information at 14:46. However, since the CC station exit passage event information is not included in the expected event information, the mobile terminal 100 searches for a new travel route and transportation.

For example, referring to FIG. 12C, the mobile terminal 100 may search for a travel route for getting on the bus No. 111 at the CC station and moving to the BB neighborhood XX coffee shop, and update the expected event information from 'getting on bus No. 123 at 14:50, getting off bus No. 123 at 14:57' into 'getting on bus No. 111 at 14:50, getting off bus No. 111 at 15:10'. Then, the mobile terminal 100 may provide 'CC station→BB neighborhood XX coffee shop, bus No. 111, expected bus arrival time: 14:50, transportation time: 20 minutes, expected destination arrival time: 15:10' as guidance information corresponding to the CC station exit passage event information.

On the other hand, when the user is unable to arrive at the destination at the engagement time, the mobile terminal 100 may transmit an engagement delay message to a mobile phone of the acquaintance with whom the user is scheduled to meet. For example, when the user gets off at the CC station instead of at the BB station and is expected to be later than the engagement time by about 10 minutes, the mobile terminal 100 may transmit a message 'current location of ΔΔ: CC region, expected BB neighborhood XX coffee shop arrival time of ΔΔ: 15:10' to a mobile phone of the acquaintance with whom the user is scheduled to meet at the BB neighborhood XX coffee shop at 15:00.

Figure 13:
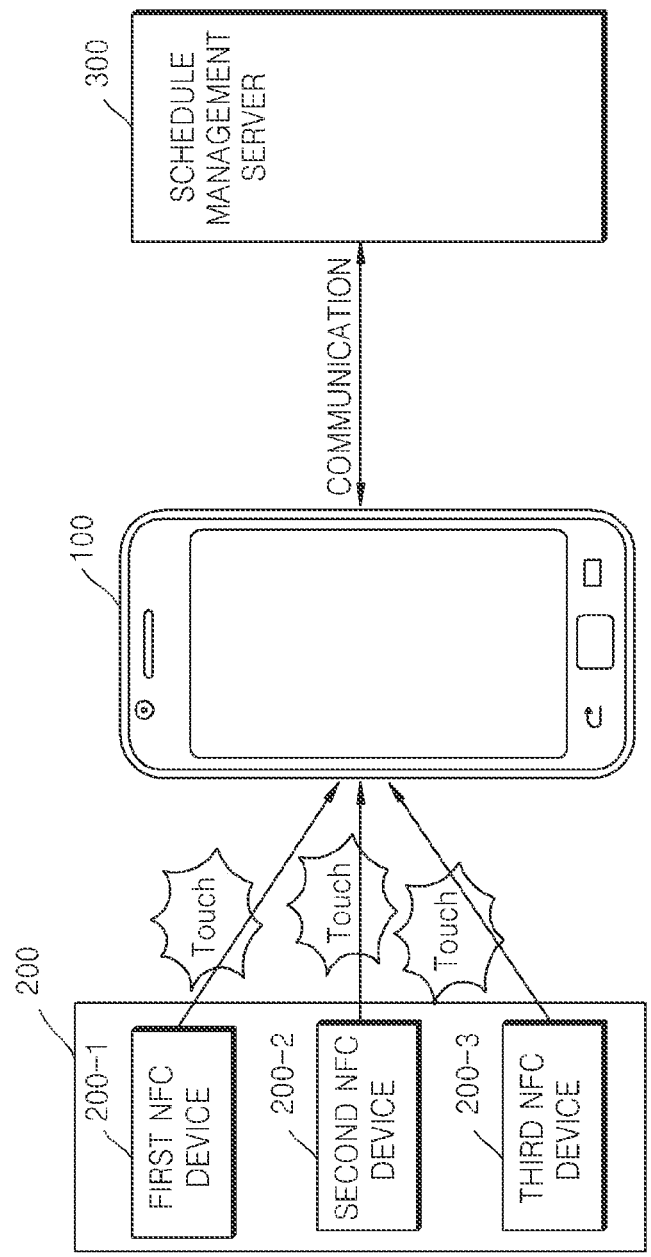
FIG. 13 is a diagram illustrating a schedule management system according to another embodiment of the present disclosure.

FIG. 13 is a diagram illustrating a schedule management system according to another embodiment of the present disclosure.

The schedule management system according to another embodiment of the present disclosure may include a mobile terminal 100, an NFC device 200, and a schedule management server 300. The NFC device 200 may include a plurality of NFC drives, for example, first NFC device 200-1, second NFC device 200-2, and third NFC device 200-3.

According to another embodiment of the present disclosure, the mobile terminal 100 may communicate wirelessly with the schedule management server 300. For example, the mobile terminal 100 may transmit user schedule information to the schedule management server 300, or may transmit event information collected through NFC. Also, the mobile terminal 100 may receive guidance information corresponding to the collected event information or the expected event information from the schedule management server 300.

The schedule management server 300 is a server that manages a user schedule by wireless communication with the mobile terminal 100 of the user. The schedule management server 300 may analyze the user schedule information and extract the expected event information. Also, the schedule management server 300 may update the expected event information based on the event information received from the mobile terminal 100.

Hereinafter, a method for the schedule management server 300 to manage a user schedule will be described in detail with reference to FIGS. 14 and 15.

Figure 14:
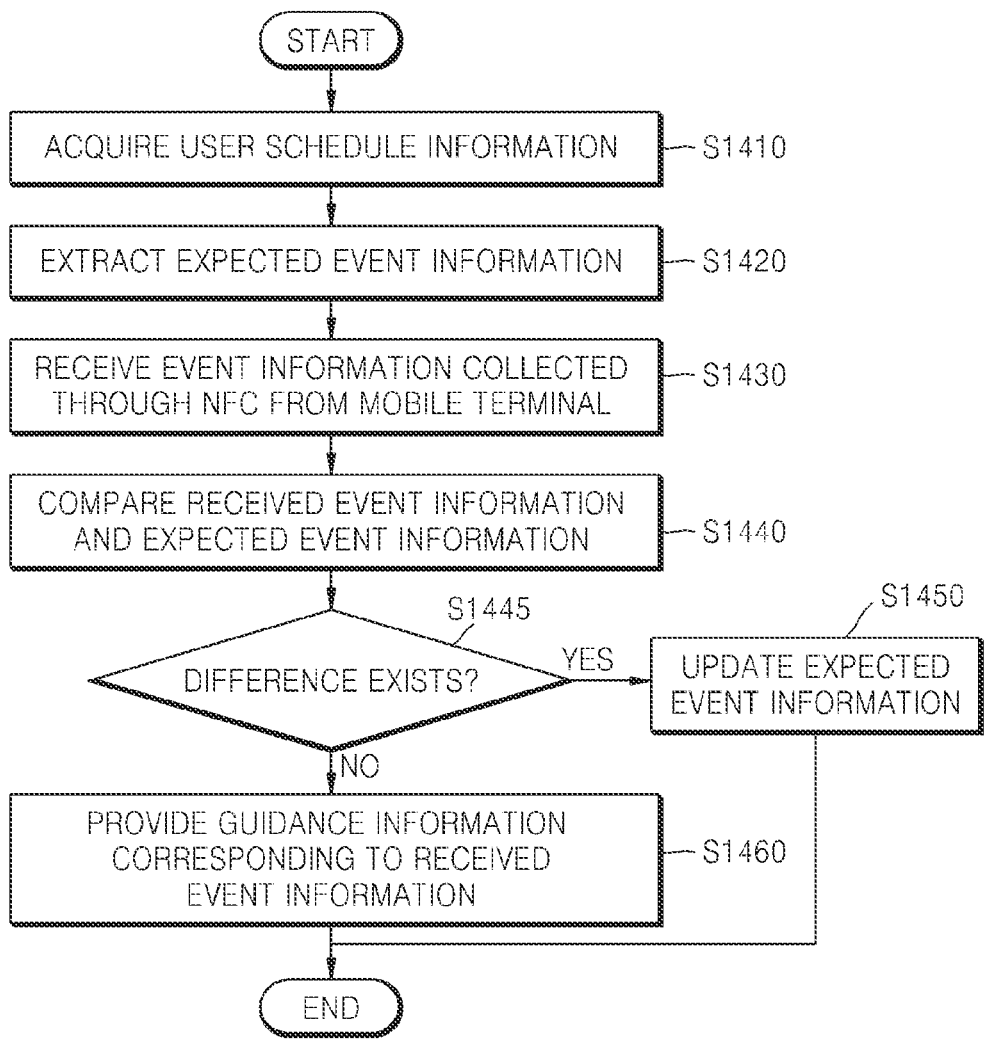
FIGS. 14 and 15 are flowcharts illustrating a schedule management method of a schedule management server according to an embodiment of the present disclosure.
Figure 15:
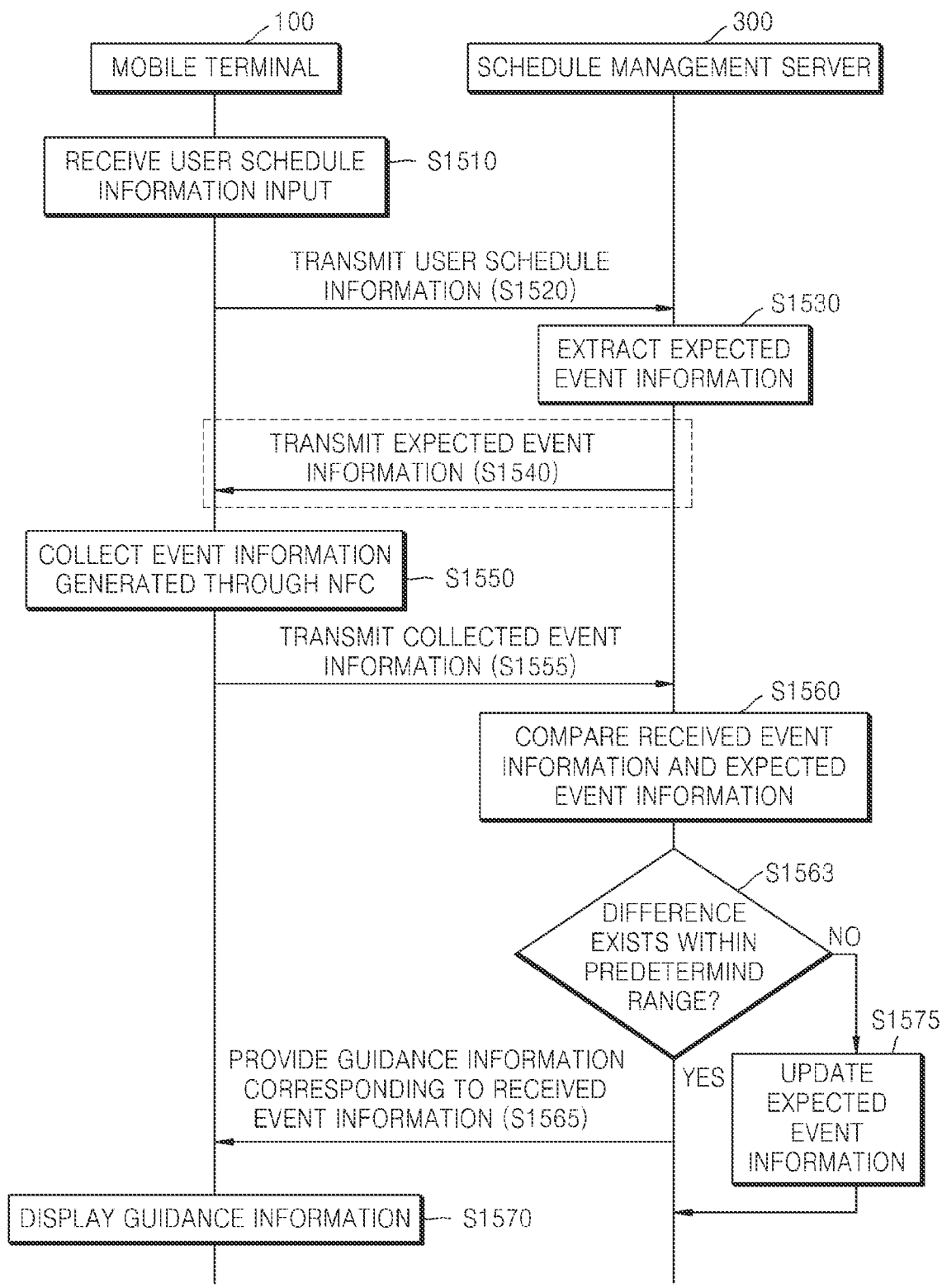

FIGS. 14 and 15 are flowcharts illustrating a schedule management method of a schedule management server according to an embodiment of the present disclosure.

Referring to FIG. 14, in operation S1410, the schedule management server 300 may acquire user schedule information. The schedule management server 300 may receive the user schedule information from the mobile terminal 100, or may receive the user schedule information from an external server (e.g., a Social Networking Service (SNS) server). The user schedule information may include origin information, route information, destination information, traffic reservation information, lodging reservation information, restaurant reservation information, and medical treatment reservation information.

In operation S1420, the schedule management server 300 may extract at least one piece of expected event information based on the user schedule information. The expected event information may include at least one of expected event attribute, expected occurrence time, and expected occurrence location. The expected event attribute is a type of an expected event, and may include a payment event, a gate passage event, and a touch event on an NFC device installed at a predetermined location.

According to an embodiment of the present disclosure, the schedule management server 300 may determine a travel route and transportation based on the user schedule information, and extract the expected event information based on the determined travel route and transportation. According to an embodiment of the present disclosure, the schedule management server 300 may determine a travel route and transportation in consideration of the shortest distance, the lowest expense, and a user preference (e.g., preferred transportation and preferred travel route).

In operation S1430, the schedule management server 300 may receive the event information collected through NFC by the mobile terminal 100 from the mobile terminal 100. That is, the schedule management server 300 may acquire the event information actually generated through the mobile terminal 100.

The event information may include an attribute of an event generated through NFC, an event occurrence time (e.g., event collection time), an event occurrence location (e.g., event collection location), and information (e.g., NFC device identification code, and URL) received from the NFC device 200.

In operation S1440, the schedule management server 300 may compare the event information received from the mobile terminal 100 and the expected event information. That is, the schedule management server 300 may compare an event actually generated by the mobile terminal 100 and an expected event. According to an embodiment of the present disclosure, the schedule management server 300 may compare the attribute, occurrence time and occurrence location of an actual event with the attribute, occurrence time and occurrence location of an expected event. In operation S1445, the schedule management server 300 determines, based on the comparison performed in operation S1440, whether a difference exists between the collected event information and the expected event information.

If it is determined that a difference exists between the collected event information and the expected event information in operation S1445, the schedule management server 300 may update the expected event information based on a result of the comparison in operation S1450.

According to an embodiment of the present disclosure, the schedule management server 300 may search for a new travel route and transportation to get to the destination, based on the actual collection location of the event information. Then, the schedule management server 300 may update the expected event information based on the new travel route and transportation.

If it is determined that a difference does not exist between the collected event information and the expected event information in operation S1445, the schedule management server 300 may provide the mobile terminal 100 with guidance information corresponding to the event information from the mobile terminal 100 in operation S1460. According to an embodiment of the present disclosure, the schedule management server 300 may provide guidance information corresponding to an event, which is to occur first, to the mobile terminal 100 based on the extracted expected event information.

According to an embodiment of the present disclosure, the schedule management server 300 may receive disclosure range setting information of the guidance information from the mobile terminal 100. That is, the user may set the disclosure range of the guidance information through the mobile terminal 100. For example, the user may perform a setting such that only the occurrence location and occurrence time of a payment event are disclosed and the payment details information is not disclosed.

The schedule management server 300 may provide the guidance information to the mobile terminal 100 according to the set disclosure range. After operation S1460, the schedule management server 300 may end the schedule management method of the present embodiment.

FIG. 15 is a flowchart illustrating a schedule management method according to an embodiment of the present disclosure.

Referring to FIG. 15, in operation S1510, the mobile terminal 100 may receive user schedule information. That is, according to an embodiment of the present disclosure, the user may input the user schedule information to the mobile terminal 100 by operating a schedule management application included in the mobile terminal 100. The user may input information about a business trip schedule, a trip schedule, a medical treatment schedule, an exploration schedule, and an engagement schedule with an acquaintance to the mobile terminal 100.

On the other hand, the user may reserve transportation, lodges, and restaurants through the schedule management application included in the mobile terminal 100. In this case, the schedule management server 300 may receive reservation request information including at least one of traffic information, lodging information, and restaurant information from the mobile terminal 100. The schedule management server 300 may perform reservation processing on transportation, lodges, and restaurants, and manage the reservation processing result as the user schedule information.

In operation S1520, the mobile terminal 100 may transmit the user schedule information to the schedule management server 300. In operation S1530, the schedule management server 300 may extract the expected event information based on the user schedule information Since operation S1530 of FIG. 15 corresponds to operation S1420 of FIG. 14, a detailed description thereof is omitted.

In operation S1540, the schedule management server 300 may transmit the extracted expected event information to the mobile terminal 100. In this case, the mobile terminal 100 may output the received expected event information.

In operation S1550, the mobile terminal 100 may collect event information generated through NFC. For example, when there occurs a payment event where a payment is made through the mobile card stored in the mobile terminal 100, the mobile terminal 100 may collect a payment event occurrence time, a payment event occurrence location, and payment content (e.g., a payment amount, a payment terminal code, and franchise store identification information) as the event information. Also, when a gate passage event occurs, the mobile terminal 100 may collect a gate passage event occurrence time, a gate passage event occurrence location, a gate name, and identification information of an NFC device attached to a gate, as the event information. In operation S1555, the mobile terminal 100 may transmit the collected user schedule information to the schedule management server 300.

In operation S1560, the schedule management server 300 may compare the received event information and the expected event information. In operation S1563, the schedule management server 300 determines, based on the comparison performed in operation S1560, whether a difference exists between the received event information and the expected event information within a predetermined range. When the schedule management server 300 determines that a difference between the received event information and the expected event information is within a predetermined range in operation S1563, the schedule management server 300 may provide guidance information corresponding to the received event information to the mobile terminal 100 in operation S1565. In this case, in operation S1570, the mobile terminal 100 may display the guidance information received from the schedule management server 300. According to an embodiment of the present disclosure, the mobile terminal 100 may display the guidance information in a pop-up form.

On the other hand, when the schedule management server 300 determines that the difference between the received event information and the expected event information is not within the predetermined range in operation S1563, the schedule management server 300 may update the expected event information based on the received event information in operation S1575. Then, according to an embodiment of the present disclosure, the schedule management server 300 may transmit the updated expected event information to the mobile terminal 100.

According to an embodiment of the present disclosure, the schedule management server 300 updates the expected event information based on the event information actually generated through an NFC touch, thus providing the best guidance information suitable for the current situation of the user.

According to an embodiment of the present disclosure, when the user schedule is simple, the mobile terminal may compare the expected event information and the actual event information and provide the guidance information to the user. On the other hand, when the user schedule is complex, the mobile terminal may compare the expected event information and the actual event information and provide the guidance information to the user in real time.

Also, according to an embodiment of the present disclosure, the schedule management server 300 may provide the expected event information, the event information actually generated in the mobile terminal 100, the guidance information, and the updated expected event information to other devices than the mobile terminal 100 of the user. For example, when the user is on an overseas business trip on the official business of a company, the schedule management server 300 may transmit the expected event information of the user and the event information actually generated in the mobile terminal 100 of the user to a device of the company.

FIGS. 16A, 16B, and 16C are diagrams illustrating a business trip schedule management system according to an embodiment of the present disclosure.

Referring to FIGS. 16A, 16B, and 16C, the user may input a business trip schedule to the mobile terminal 100. In this case, the mobile terminal 100 transmits the business trip schedule of the user to the schedule management server 300.

The schedule management server 300 determines a travel route and transportation based on the user's business trip schedule received from the mobile terminal 100, and extracts the expected event information. For example, when the user takes a business trip from Seoul to LA, the schedule management server 300 may search for a route for moving from Seoul to Incheon Airport by airport bus, moving to LA Airport by taking an airplane at Incheon Airport, and moving from LA Airport to OO Hotel in LA by rental car, and extract the expected event information according to the route.

The schedule management server 300 may compare the expected event information and the actual event information, and provide the guidance information to the mobile terminal 100. When an airport bus fare payment event occurs through NFC, the schedule management server 300 may provide 'payment amount: 10,000 won, transportation time: 40 minutes, expected Incheon Airport arrival time: 10:00' as guidance information corresponding to the payment event to the mobile terminal 100.

When an Incheon Airport entrance passage event occurs, the schedule management server 300 may provide guidance information, such as 'airplane flight: AB123, boarding time: 12:00, boarding gate: #3, transportation time: 10 hours' to the mobile terminal 100.

When an LA Airport exit passage event occurs, the schedule management server 300 may provide guidance information, such as rental car reservation information or a travel route to OO Hotel (e.g., use bus No. 123, bus boarding location information, disembarking stop name, and transportation time) to the mobile terminal 100.

Also, with respect to the subsequent business trip schedule, the schedule management server 300 may provide guidance information to the mobile terminal 100. On the other hand, the schedule management server 300 may receive location information of a business trip place, change the guidance information by the local time at the location of the business trip place and the language at the business trip place, and provide the resulting information to the mobile terminal 100.

Therefore, according to an embodiment of the present disclosure, the user may check the guidance information provided by the schedule management server 300 and effectively perform a business trip schedule at an unfamiliar business trip place.

FIGS. 17A, 17B, and 17C are diagrams illustrating a medical treatment schedule management method according to an embodiment of the present disclosure.

The schedule management server 300 may acquire a medical treatment reservation schedule of the user. In this case, the schedule management server 300 according to an embodiment of the present disclosure may communicate with a hospital server.

When the user visits a hospital and touches the mobile terminal 100 against an NFC device installed at an entrance of the hospital, the mobile terminal 100 may collect hospital entrance passage event information generated through NFC. In this case, the mobile terminal 100 may transmit the hospital entrance passage event information to the schedule management server 300.

Referring to FIG. 17A, the schedule management server 300 may compare the hospital entrance passage event information and the expected event information. When a difference between the hospital entrance passage event information and the expected event information is within a predetermined range, the schedule management server 300 may provide 'consultation room: OO ward 3F room 304, doctor in-charge: OOO professor' as guidance information corresponding to the hospital entrance passage event information to the mobile terminal 100.

Also, referring to FIG. 17B, when the user exits the consultation room and touches the mobile terminal 100 against the NFC device, the schedule management server 300 may receive consultation room exit passage event information, and provide information about an X-ray examination room (OO building 1F room #3), which the user is to stop at, as guidance information corresponding to the consultation room exit passage event information.

Also, referring to FIG. 17C, when the user touches the mobile terminal 100 against an NFC device installed in front of the examination room after X-ray examination, the schedule management server 300 may receive X-ray examination completion event information, and provide location information and medical treatment fee information for receipt/ medical treatment reservation (location: beside OO building 2F stairs, fee: 35,000 won), as guidance information corresponding to the X-ray examination completion event information.

Figure 18:
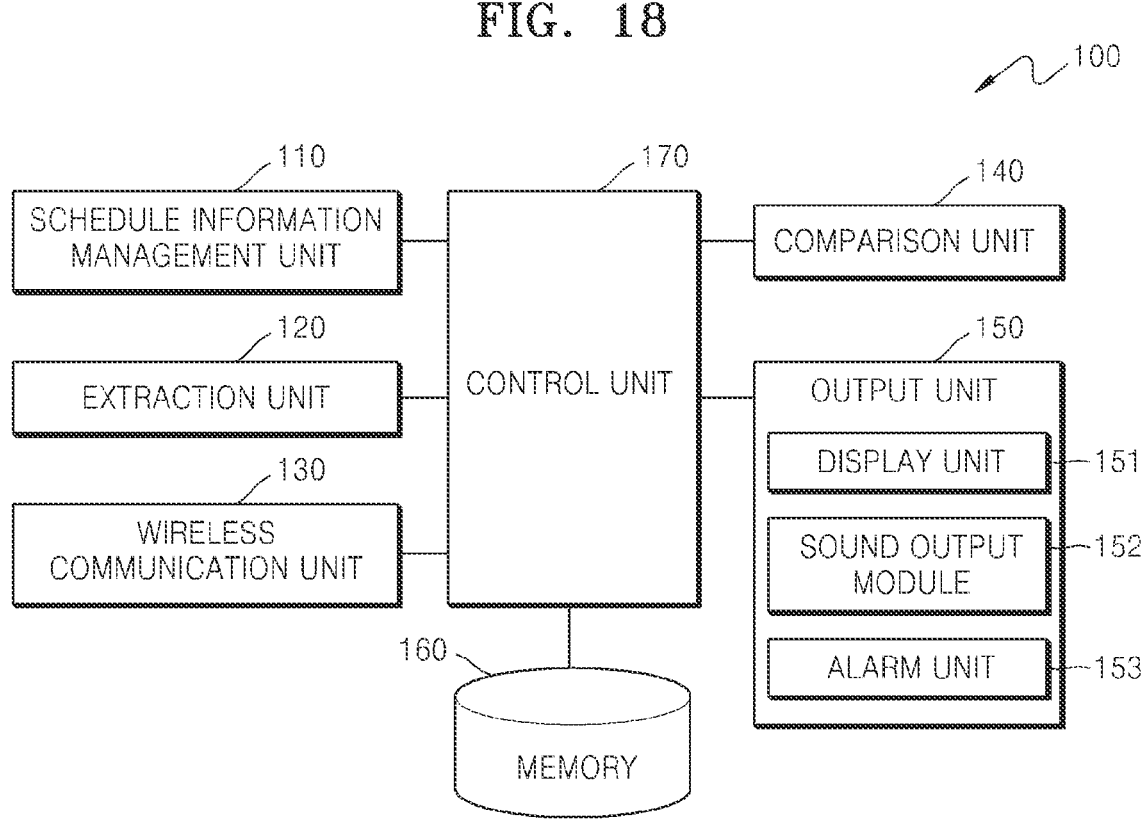
FIG. 18 is a block diagram of a mobile terminal according to an embodiment of the present disclosure.

FIG. 18 is a block diagram of a mobile terminal 100 according to an embodiment of the present disclosure.

Referring to FIG. 18, the mobile terminal 100 according to an embodiment of the present disclosure may include a schedule information management unit 110, an extraction unit 120, a wireless communication unit 130, a comparison unit 140, an output unit 150, a memory 160, and a control unit 170. However, the mobile terminal 100 may be implemented by more components than the illustrated components, and the mobile terminal 100 may be implemented by fewer components than the illustrated components.

The above components will be described below.

The schedule information management unit 110 may acquire user schedule information. The schedule information management unit 110 may receive an input of the user schedule information from the user, and may receive the user schedule information from an external server. The schedule information management unit 110 may delete the previous user schedule information from the memory 160.

The schedule information management unit 110 may transmit reservation request information including at least one of traffic information, lodging information, and restaurant information to a reservation server based on a user input, and receive reservation result information from the reservation server. In this case, the schedule information management unit 110 may manage the reservation result information as the user schedule information.

The extraction unit 120 may extract at least one piece of expected event information based on the user schedule information. The extraction unit 120 may determine a travel route and transportation based on the user schedule information, and extract the expected event information based on the determined travel route and transportation.

The extraction unit 120 may determine the travel route and transportation in consideration of the shortest distance, the lowest expense, and a user preference.

The wireless communication unit 130 may include one or more components that enables communication with an external device and a network in which the external device is located. For example, the wireless communication unit 130 may include an NFC module, a wireless Internet module, a mobile communication module, and a location information module.

The NFC module is a module for NFC. Examples of the NFC technology may include Bluetooth, Ultra Wideband (UWB), ZigBee, NFC, Wi-Fi Direct (WFD), and Infrared Data Association (IrDA).

The wireless Internet module is a module for wireless Internet connection, and may be installed inside or outside. The mobile communication module communicates radio signals with at least one of a base station, an external device and a server on a mobile communication network.

The location information module is a module for detecting or obtaining the location of the mobile terminal 100. Examples of the location information module include a GPS module. The GPS module receives location information from a plurality of artificial satellites. Herein, the location information may include coordinate information represented by latitude and longitude.

The wireless communication unit 130 according to an embodiment of the present disclosure may collect event information generated through NFC. That is, the wireless communication unit 130 may communicate data with the NFC device 200 through NFC.

The wireless communication unit 130 according to an embodiment of the present disclosure may transmit the collected event information to the schedule management server 300, or may receive the guidance information corresponding to the collected event information from the schedule management server 300.

The comparison unit 140 may compare the collected event information and the expected event information. For example, the comparison unit 140 may compare the attribute, occurrence time and occurrence location (e.g., GPS coordinates or NFC device identification code) of an event generated through NFC, with the attribute, occurrence time, and occurrence location of an expected event.

The output unit 150 outputs an audio signal, a video signal, or an alarm signal, and may include a display unit 151, a sound output module 152, and an alarm unit 153.

The display unit 151 displays information processed by the mobile terminal 100. The display unit 151 may include at least one of a liquid crystal display, a thin film transistor-liquid crystal display, an organic light-emitting diode display, a flexible display, a 3 Dimensional (3D) display, and a transparent display. According to the implementation type of the mobile terminal 100, two or more display units 151 may be provided. When the display unit 151 and a touch pad are configured as a touchscreen with a layered structure, the display unit 151 may be used as an input device in addition to an output device.

Also, the sound output module 152 outputs sound signals (e.g., call signal reception sound and message reception sound) related to the functions performed by the mobile terminal 100. The sound output module 152 may include a speaker and a buzzer. The alarm unit 153 outputs a signal for notifying the event generation of the mobile terminal 100.

The output unit 150 may provide the guidance information corresponding to the collected event disclosure based on a result of the comparison between the collected event information and the expected event information. That is, when a difference between the collected event information and the expected event information is within a predetermined range, the output unit 150 may output the guidance information corresponding to the collected event information.

The output unit 150 may output the extracted expected event information. Also, when the expected event information is updated, the output unit 150 may output the updated expected event information.

The output unit 150 according to an embodiment of the present disclosure may display the guidance information corresponding to an event, which is to occur first, based on the expected event information. Also, when a disclosure range is set, the output unit 150 may output the guidance information within the set disclosure range. On the other hand, the output unit 150 may provide the guidance information corresponding to the collected event information in a pop-up form.

The memory 160 may store programs for processing/control of the control unit 170, and may temporarily store input/output data (e.g., user schedule information and expected event information).

The memory 160 may include at least one type of storage medium among a flash memory type, a hard disk type, a multimedia card micro type, a card type memory (e.g., Secure Digital (SD) or xD memory), Random Access Memory (RAM), Static Random Access Memory (SRAM), Read-Only Memory (ROM), Electrically Erasable Programmable Read-Only Memory (EEPROM), Programmable Read-Only Memory (PROM), a magnetic memory, a magnetic disk, and an optical disk. Also, the mobile terminal 100 may operate a web storage that performs a storage function of the memory 160 on the Internet.

The control unit 170 controls an overall operation of the mobile terminal 100. That is, the control unit 170 may overall control the schedule information management unit 110, the extraction unit 120, the wireless communication unit 130, the comparison unit 140, the output unit 150, and the memory 160.

The control unit 170 may update the expected event information based on a difference between the collected event information and the expected event information. For example, the control unit 170 may search for a new travel route and transportation to get to a destination, based on a location at which the event information generated through NFC is collected, and update the expected event information according to the new travel route and transportation.

The control unit 170 may generate a plurality of pieces of expected route information based on the collected event information, and display the plurality of pieces of generated expected route information through the output unit 150. Also, the control unit 170 may receive an input of at least one of the plurality of pieces of expected route information, and update the expected event information based on the selected expected route information.

The output unit 170 may update the expected event information at predetermined periods. Also, the control unit 170 may update the expected event information based on the location of the mobile terminal 100. On the other hand, the output unit 170 may set a disclosure range of the guidance information based on a user input.

Figure 19:
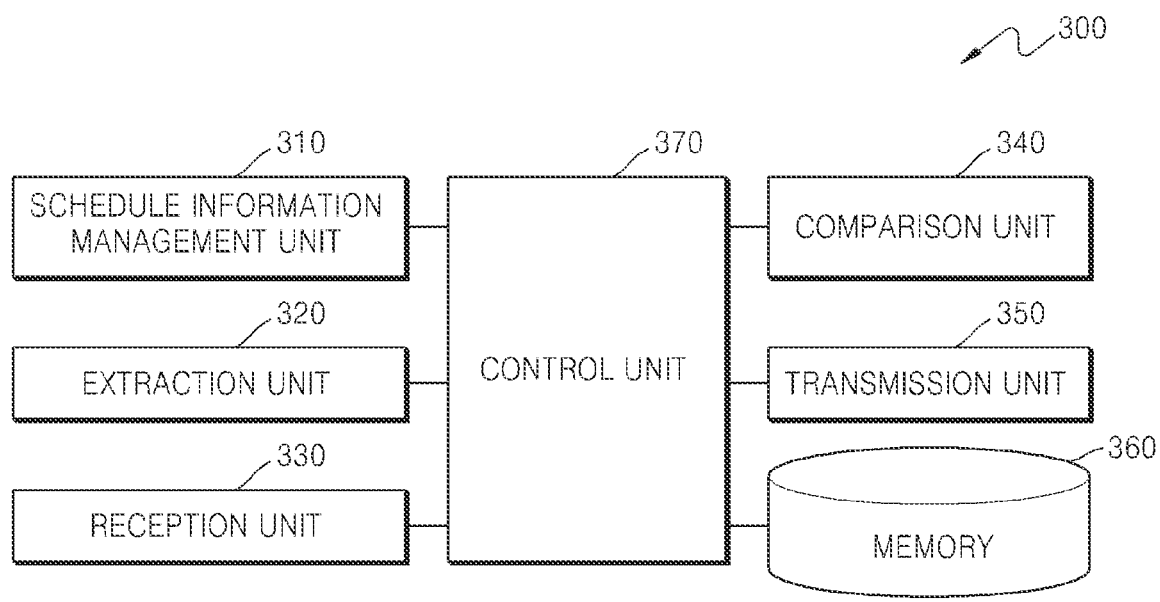
FIG. 19 is a block diagram of a schedule management server according to an embodiment of the present disclosure.

FIG. 19 is a block diagram of a schedule management server 300 according to an embodiment of the present disclosure.

Referring to FIG. 19, the schedule management server 300 according to an embodiment of the present disclosure may include a schedule information management unit 310, an extraction unit 320, a reception unit 330, a comparison unit 340, a transmission unit 350, a memory 360, and a control unit 370. The schedule management server 300 may be implemented by more components than the illustrated components, and the schedule management server 300 may be implemented by less components than the illustrated components.

The above components will be described below.

The schedule information management unit 310 may acquire user schedule information. The schedule information management unit 310 according to an embodiment of the present disclosure may receive the user schedule information from the mobile terminal 100, or may receive the user schedule information from an external server (e.g., SNS server).

The extraction unit 320 may extract at least one piece of expected event information based on the user schedule information. For example, the extraction unit 320 may determine a travel route and transportation based on the user schedule information, and extract the expected event information based on the determined travel route and transportation. In this case, the extraction unit 320 may determine the travel route and transportation in consideration of a user preference.

The reception unit 330 may receive the event information collected by the mobile terminal 100 through NFC, from the mobile terminal 100. Also, the reception unit 330 may receive reservation request information including at least one of traffic information, lodging information, and restaurant information from the mobile terminal 100. On the other hand, the reception unit 330 may receive disclosure range setting information of guidance information from the mobile terminal 100.

The comparison unit 340 may compare the event information received from the mobile terminal 100 and the expected event information. That is, the comparison unit 340 may compare whether the event information actually collected through NFC is identical to the expected event information.

The transmission unit 350 may provide the guidance information corresponding to the received event disclosure to the mobile terminal 100 based on a result of the comparison between the received event information and the expected event information. That is, when a difference between the received event information and the expected event information is within a predetermined range, the transmission unit 350 may extract and provide guidance information corresponding to the received event information to the mobile terminal 100.

On the other hand, the transmission unit 350 may provide the expected event information to the mobile terminal 100. When the expected event information is updated, the transmission unit 350 may provide the updated expected event information to the mobile terminal 100.

The transmission unit 350 may provide the guidance information corresponding to an event, which is to occur first, to the mobile terminal 100 based on the extracted expected event information. Also, when a disclosure range of the guidance information is set, the transmission unit 350 may provide the guidance information to the mobile terminal 100 within the set disclosure range.

The memory 360 may store programs for processing/control of the control unit 370, and may temporarily store input/output data (e.g., user schedule information and expected event information).

The control unit 370 controls an overall operation of the schedule management server 300. That is, the control unit 370 may overall control the schedule information management unit 310, the extraction unit 320, the reception unit 330, the comparison unit 340, the transmission unit 350, and the memory 360.

According to an embodiment of the present disclosure, the control unit 370 may update the expected event information based on a difference between the expected event information and the event information received from the mobile terminal 100. For example, the control unit 370 may search for a new travel route and transportation to get to a destination, based on a location at which the received event information is collected, and update the expected event information according to the new travel route and transportation.

According to an embodiment of the present disclosure, the control unit 370 may generate a plurality of pieces of expected route information based on the collected event information, and provide the plurality of pieces of generated expected route information through the transmission unit 350 to the mobile terminal 100. Also, the control unit 370 may receive an input of at least one of the plurality of pieces of expected route information through the reception unit 330, and update the expected event information based on the selected expected route information.

The methods according to the various embodiments of the present disclosure may be embodied in the form of program commands executable through various computer means, which may be recorded on a non-transitory computer-readable recording medium. The non-transitory computer-readable recording medium may include program commands, data files, and data structures either alone or in combination. The program commands recorded on the non-transitory computer-readable recording medium may be those that are especially designed and configured for the present disclosure, or may be those that are publicly known and available to computer programmers skilled in the art. Examples of the non-transitory computer-readable recording medium include magnetic recording media such as hard disks, floppy disks and magnetic tapes, optical recording media such as Compact Disc (CD)-ROMs and Digital Versatile Discs (DVDs), magneto-optical recording media such as floptical disks, and hardware devices such as ROMs, RAMs and flash memories that are especially configured to store and execute program commands. Examples of the program commands include machine language codes that may be generated by a compiler, and high-level language codes that may be executed by a computer by using an interpreter.

According to the various embodiments of the present disclosure, the mobile terminal 100 or the schedule management server 300 compares the expected event information extracted based on the user schedule information and the event information actually collected through NFC step-by-step, thereby making it possible to provide useful guidance information to the user and to efficiently manage the user schedule.

While the present disclosure has been shown and described with reference to various embodiments thereof, it will be understood by those skilled in the art that various changes in form and details may be made therein without departing from the spirit and scope of the present disclosure as defined by the following claims and their equivalents.

What is claimed is:

1. A schedule management method of a mobile terminal, the schedule management method comprising:
   acquiring, via a processor, user schedule information;
   determining at least one expected event that occurs through near field communication, based on the user schedule information, the at least one expected event being a future event comprising at least a predetermined location of a near field communication device for scanning along a route initially determined from the user schedule information;
   extracting, via the processor, expected event information about the determined at least one expected event, the expected event information comprising information on events along the route that have yet to occur;
   collecting, via the processor, event information generated through the near field communication;
   comparing, via the processor, the collected event information and the expected event information, the collected event information comprising information on events that have occurred;
   outputting, via a display, guidance information corresponding to the collected event information based on a result of the comparison; and
   updating, via the processor, the expected event information based on a difference between the collected event information and the expected event information,
   wherein the updating of the expected event information comprises updating the expected event information based on the collected event information when the expected event information is different from the collected event information,
   wherein, when the collected event information matches an event beyond a next event in a sequence of the expected event information, the expected event information is updated to have the next event in the sequence of expected event information set to an event one event beyond the event matching the matched event in the sequence of the expected event information,
   wherein the expected event information comprises an attribute and occurrence time of the expected event, and
   wherein the attribute of the expected event is a type of an expected event.

2. The schedule management method of claim 1, wherein the expected event information includes at least one from among expected event attribute, expected occurrence time, or expected occurrence location.

3. The schedule management method of claim 1, further comprising outputting the extracted expected event information.

4. The schedule management method of claim 1, wherein the updating of the expected event information comprises:
searching for a new travel route and transportation to get to a destination, based on a location at which the event information generated through the near field communication is collected; and
updating the expected event information according to the new travel route and transportation.

5. The schedule management method of claim 1, further comprising updating the expected event information at predetermined periods.

6. The schedule management method of claim 1, further comprising updating the expected event information based on a location of the mobile terminal.

7. The schedule management method of claim 1, further comprising outputting the updated expected event information.

8. The schedule management method of claim 1, wherein the updating of the expected event information comprises:
generating a plurality of pieces of expected route information based on the collected event information;
displaying the plurality of pieces of generated expected route information;
receiving a selection of at least one of the plurality of pieces of expected route information; and
updating the expected event information based on the selected expected route information.

9. The schedule management method of claim 1, wherein the acquiring of the user schedule information comprises:
transmitting reservation request information including at least one from among traffic information, lodging information, or restaurant information to a reservation server based on a user input; and
receiving reservation result information from the reservation server.

10. The schedule management method of claim 1, wherein the extracting of the expected event information comprises:
determining a travel route and transportation based on the user schedule information; and
extracting the expected event information based on the travel route and transportation.

11. The schedule management method of claim 10, wherein the determining of the travel route and transportation comprises determining the travel route and transportation in further consideration of a user preference.

12. The schedule management method of claim 1, further comprising displaying guidance information corresponding to an event, which is to occur first, based on the extracted expected event information.

13. The schedule management method of claim 1, wherein the user schedule information includes at least one from among origin information, route information, destination information, traffic reservation information, lodging reservation information, or restaurant reservation information.

14. The schedule management method of claim 1, wherein the providing of the guidance information comprises:
setting a disclosure range of the guidance information based on a user input; and
providing the guidance information within the set disclosure range.

15. The schedule management method of claim 1, wherein the providing of the guidance information comprises providing the guidance information corresponding to the collected event information in a pop-up form.

16. A schedule management method of a schedule management server, the schedule management method comprising:
acquiring, via a processor, user schedule information;
determining, via the processor, at least one expected event that occurs through near field communication, based on the user schedule information, the at least one expected event being a future event comprising at least a predetermined location of a near field communication device for scanning along a route initially determined from the user schedule information;
extracting, via the processor, expected event information about the determined at least one expected event, the expected event information comprising information on events along the route that have yet to occur;
receiving, via the processor, event information collected through the near field communication by a mobile terminal from the mobile terminal;
comparing, via the processor, the received event information and the expected event information, the collected event information comprising information on events that have occurred;
outputting, via a display, guidance information corresponding to the received event information to the mobile terminal based on a result of the comparison; and
updating, via the processor, the expected event information based on a difference between the received event information and the expected event information,
wherein the updating of the expected event information comprises updating the expected event information based on the collected event information when the expected event information is different from the collected event information,
wherein, when the collected event information matches an event beyond a next event in a sequence of the expected event information, the expected event information is updated to have the next event in the sequence of expected event information set to an event one event beyond the event matching the matched event in the sequence of the expected event information,
wherein the expected event information comprises an attribute and occurrence time of the expected event, and
wherein the attribute of the expected event is a type of an expected event.

17. The schedule management method of claim 16, wherein the expected event information includes at least one from among expected event attribute, expected occurrence time, or expected occurrence location.

18. The schedule management method of claim 16, further comprising providing the extracted expected event information to the mobile terminal.

19. The schedule management method of claim 16, wherein the updating of the expected event information comprises:
searching for a new travel route and transportation to get to a destination, based on a location at which the received event information is collected; and
updating the expected event information according to the new travel route and transportation.

20. The schedule management method of claim 16, further comprising providing the updated expected event information to the mobile terminal.

21. The schedule management method of claim 16, wherein the updating of the expected event information comprises:
  generating a plurality of pieces of expected route information based on the collected event information;
  providing the plurality of pieces of generated expected route information to the mobile terminal;
  receiving a user selection of at least one of the plurality of pieces of expected route information from the mobile terminal; and
  updating the expected event information based on the selected expected route information.

22. The schedule management method of claim 16, wherein the acquiring of the user schedule information comprises receiving reservation request information including at least one from among traffic information, lodging information, or restaurant information from the mobile terminal.

23. The schedule management method of claim 16, wherein the user schedule information includes at least one from among origin information, route information, destination information, traffic reservation information, lodging reservation information, or restaurant reservation information.

24. The schedule management method of claim 16, wherein the extracting of the expected event information comprises:
  determining a travel route and transportation based on the user schedule information; and
  extracting the expected event information based on the travel route and transportation.

25. The schedule management method of claim 24, wherein the determining of the travel route and transportation comprises determining the travel route and transportation in further consideration of a user preference.

26. The schedule management method of claim 16, wherein the extracting of the expected event information comprises providing guidance information corresponding to an event, which is to occur first, to the mobile terminal based on the extracted expected event information.

27. The schedule management method of claim 16, wherein the providing of the guidance information to the mobile terminal comprises:
  receiving disclosure range setting information of the guidance information from the mobile terminal; and
  providing the guidance information to the mobile terminal based on the disclosure range setting information.

28. A mobile terminal comprising:
  at least one processor configured to:
    acquire user schedule information,
    determine at least one expected event that occurs through near field communication, based on the user schedule information, the at least one expected event being a future event comprising at least a predetermined location of a near field communication device for scanning along a route initially determined from the user schedule information,
    extract expected event information about the determined at least one expected event, the expected event information comprising information on events along the route that have yet to occur,
    collect event information through the near field communication, and
    compare the collected event information and the expected event information, the collected event information comprising information on events that have occurred, and
  an outputter configured to provide guidance information corresponding to the collected event information based on a result of the comparison,
  wherein the at least one processor is further configured to:
    update the expected event information based on a difference between the collected event information and the expected event information, and
    update the expected event information based on the collected event information when the expected event information is different from the collected event information,
  wherein, when the collected event information matches an event beyond a next event in a sequence of the expected event information, the expected event information is updated to have the next event in the sequence of expected event information set to an event one event beyond the event matching the matched event in the sequence of the expected event information,
  wherein the expected event information comprises an attribute and occurrence time of the expected event, and
  wherein the attribute of the expected event is a type of an expected event.

29. The mobile terminal of claim 28, wherein the expected event information includes at least one from among expected event attribute, expected occurrence time, or expected occurrence location.

30. The mobile terminal of claim 28, wherein the outputter is further configured to output the extracted expected event information.

31. The mobile terminal of claim 28, wherein the at least one processor is further configured to:
  search for a new travel route and transportation to get to a destination, based on a location at which the event information generated through the near field communication is collected, and
  update the expected event information according to the new travel route and transportation.

32. The mobile terminal of claim 28, wherein the at least one processor is further configured to update the expected event information at predetermined periods.

33. The mobile terminal of claim 28, wherein the at least one processor is further configured to update the expected event information based on a location of the mobile terminal.

34. The mobile terminal of claim 28, wherein the outputter is further configured to output the updated expected event information.

35. The mobile terminal of claim 28, wherein the at least one processor is further configured to:
  generate a plurality of pieces of expected route information based on the collected event information,
  display the plurality of pieces of generated expected route information,
  receive a selection of at least one of the plurality of pieces of expected route information, and
  update the expected event information based on the selected expected route information.

36. The mobile terminal of claim 28, wherein the at least one processor is further configured to:
  transmit reservation request information including at least one from among traffic information, lodging information, or restaurant information to a reservation server based on a user input, and
  receive reservation result information from the reservation server.

37. The mobile terminal of claim 28, wherein the at least one processor is further configured to:

determine a travel route and transportation based on the user schedule information, and extract the expected event information based on the determined travel route and transportation.

38. The mobile terminal of claim 37, wherein the at least one processor is further configured to determine the travel route and transportation in further consideration of a user preference.

39. The mobile terminal of claim 28, wherein the outputter is further configured to display guidance information corresponding to an event, which is to occur first, based on the extracted expected event information.

40. The mobile terminal of claim 28, wherein the user schedule information includes at least one from among origin information, route information, destination information, traffic reservation information, lodging reservation information, or restaurant reservation information.

41. The mobile terminal of claim 28,
wherein the at least one processor is further configured to set a disclosure range of the guidance information based on a user input, and
wherein the outputter is further configured to provide the guidance information within the set disclosure range.

42. The mobile terminal of claim 28, wherein the outputter is further configured to provide the guidance information corresponding to the collected event information in a pop-up form.

43. A schedule management server comprising:
at least one processor configured to:
acquire user schedule information,
determining at least one expected event that occurs through near field communication, based on the user schedule information, the at least one expected event being a future event comprising at least a predetermined location of a near field communication device for scanning along a route initially determined from the user schedule information,
extract expected event information about the determined at least one expected event, the expected event information comprising information on events along the route that have yet to occur,
receive event information collected through the near field communication by a mobile terminal from the mobile terminal, and
compare the received event information and the expected event information, the collected event information comprising information on events that have occurred; and
a transmitter configured to provide guidance information corresponding to the received event information to the mobile terminal based on a result of the comparison,
wherein the at least one processor is further configured to:
update the expected event information based on a difference between the received event information and the expected event information, and
update the expected event information based on the collected event information when the expected event information is different from the collected event information,
wherein, when the collected event information matches an event beyond a next event in a sequence of the expected event information, the expected event information is updated to have the next event in the sequence of expected event information set to an event one event beyond the event matching the matched event in the sequence of the expected event information, wherein the expected event information comprises an attribute and occurrence time of the expected event, and
wherein the attribute of the expected event is a type of an expected event.

44. The schedule management server of claim 43, wherein the expected event information includes at least one from among expected event attribute, expected occurrence time, or expected occurrence location.

45. The schedule management server of claim 43, wherein the transmitter is further configured to provide the extracted expected event information to the mobile terminal.

46. The schedule management server of claim 43, wherein the at least one processor is further configured to:
search for a new travel route and transportation to get to a destination, based on a location at which the received event information is collected, and
update the expected event information according to the new travel route and transportation.

47. The schedule management server of claim 43, wherein the transmitter is further configured to provide the updated expected event information to the mobile terminal.

48. The schedule management server of claim 43, wherein the at least one processor is further configured to:
generate a plurality of pieces of expected route information based on the collected event information,
provide the plurality of pieces of generated expected route information to the mobile terminal, and
receive a user selection of at least one of the plurality of pieces of expected route information from the mobile terminal.

49. The schedule management server of claim 43, wherein the at least one processor is further configured to receive reservation request information including at least one from among traffic information, lodging information, or restaurant information from the mobile terminal.

50. The schedule management server of claim 43, wherein the user schedule information includes at least one from among origin information, route information, destination information, traffic reservation information, lodging reservation information, or restaurant reservation information.

51. The schedule management server of claim 43, wherein the at least one processor is further configured to:
determine a travel route and transportation based on the user schedule information, and
extract the expected event information based on the determined travel route and transportation.

52. The schedule management server of claim 51, wherein the at least one processor is further configured to determine the travel route and transportation in further consideration of a user preference.

53. The schedule management server of claim 43, wherein the transmitter is further configured to provide guidance information corresponding to an event, which is to occur first, to the mobile terminal based on the extracted expected event information.

54. The schedule management server of claim 43,
wherein the at least one processor is further configured to receive disclosure range setting information of the guidance information from the mobile terminal, and
wherein the transmitter is further configured to provide the guidance information to the mobile terminal based on the disclosure range setting information.

55. A non-transitory computer-readable recording medium storing a program for implementing a schedule management method comprising:
acquiring user schedule information;

determining at least one expected event that occurs through near field communication, based on the user schedule information, the at least one expected event being a future event comprising at least a predetermined location of a near field communication device for scanning along a route initially determined from the user schedule information;

extracting expected event information about the determined at least one expected event, the expected event information comprising information on events along the route that have yet to occur;

collecting event information generated through the near field communication;

comparing the collected event information and the expected event information, the collected event information comprising information on events that have occurred;

providing guidance information corresponding to the collected event information based on a result of the comparison; and updating the expected event information based on a difference between the collected event information and the expected event information, wherein the updating of the expected event information comprises updating the expected event information based on the collected event information when the expected event information is different from the collected event information, wherein, when the collected event information matches an event beyond a next event in a sequence of the expected event information, the expected event information is updated to have the next event in the sequence of expected event information set to an event one event beyond the event matching the matched event in the sequence of the expected event information, wherein the expected event information comprises an attribute and occurrence time of the expected event, and wherein the attribute of the expected event is a type of an expected event.

56. A non-transitory computer-readable recording medium storing a program for implementing a schedule management method comprising:

acquiring user schedule information;

determining at least one expected event that occurs through near field communication, based on the user schedule information, the at least one expected event being a future event comprising at least a predetermined location of a near field communication device for scanning along a route initially determined from the user schedule information;

extracting expected event information about the determined at least one expected event, the expected event information comprising information on events along the route that have yet to occur;

receiving event information collected through the near field communication by a mobile terminal from the mobile terminal;

comparing the received event information and the expected event information, the collected event information comprising information on events that have occurred;

providing guidance information corresponding to the received event information to the mobile terminal based on a result of the comparison; and updating the expected event information based on a difference between the received event information and the expected event information, wherein the updating of the expected event information comprises updating the expected event information based on the collected event information when the expected event information is different from the collected event information, wherein, when the collected event information matches an event beyond a next event in a sequence of the expected event information, the expected event information is updated to have the next event in the sequence of expected event information set to an event one event beyond the event matching the matched event in the sequence of the expected event information, wherein the expected event information comprises an attribute and occurrence time of the expected event, and wherein the attribute of the expected event is a type of an expected event.

* * * * *